US009898496B2

(12) United States Patent
Caudy et al.

(10) Patent No.: US 9,898,496 B2
(45) Date of Patent: *Feb. 20, 2018

(54) DYNAMIC CODE LOADING

(71) Applicant: Walleye Software, LLC, Plymouth, MN (US)

(72) Inventors: Ryan Caudy, New York, NY (US); David R. Kent, IV, Colorado Springs, CO (US); Mark Zeldis, Randolph, NJ (US); Nathaniel J. Dorfman, Sandy, UT (US); Charles Wright, Cortlandt Manor, NY (US); Radu Teodorescu, New York, NY (US)

(73) Assignee: Illumon LLC, Plymouth, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/610,162

(22) Filed: May 31, 2017

(65) Prior Publication Data
US 2017/0270151 A1 Sep. 21, 2017

Related U.S. Application Data

(63) Continuation of application No. 15/154,998, filed on May 14, 2016, now Pat. No. 9,760,591.
(Continued)

(51) Int. Cl.
G06F 9/44 (2006.01)
G06F 17/30 (2006.01)
(Continued)

(52) U.S. Cl.
CPC ...... *G06F 17/30368* (2013.01); *G06F 3/0481* (2013.01); *G06F 3/0482* (2013.01); *G06F 3/0485* (2013.01); *G06F 3/04847* (2013.01); *G06F 3/04895* (2013.01); *G06F 3/0605* (2013.01); *G06F 3/067* (2013.01); *G06F 3/0656* (2013.01); *G06F 8/30* (2013.01); *G06F 8/41* (2013.01); *G06F 8/427* (2013.01); *G06F 8/60* (2013.01); *G06F 11/1451* (2013.01); *G06F 11/1464* (2013.01); *G06F 11/1469* (2013.01); *G06F 12/0261* (2013.01); *G06F 12/084* (2013.01); *G06F 15/17331* (2013.01);
(Continued)

(58) Field of Classification Search
CPC .......................................................... G06F 9/44
USPC .................................................. 717/149–153
See application file for complete search history.

(56) References Cited

U.S. PATENT DOCUMENTS 5,335,202 A 8/1994 Manning et al.
5,452,434 A 9/1995 Macdonald
(Continued)

FOREIGN PATENT DOCUMENTS

CA 2309462 A1 12/2000
EP 1406463 A2 4/2004
(Continued)

OTHER PUBLICATIONS

International Search Report and Written Opinion dated Jul. 28, 2016, in International Appln. No. PCT/US2016/032587 filed May 14, 2016.
(Continued)

Primary Examiner — Jae Jeon
(74) Attorney, Agent, or Firm — Carmichael IP, PLLC

(57) ABSTRACT

Described are methods, systems and computer readable media for dynamic code loading.

24 Claims, 7 Drawing Sheets

Related U.S. Application Data

(60) Provisional application No. 62/161,813, filed on May 14, 2015.

(51) Int. Cl.

| | | |
|---|---|---|
| *G06F 3/0482* | (2013.01) | |
| *G06F 3/0489* | (2013.01) | |
| *G06F 17/22* | (2006.01) | |
| *G06F 17/24* | (2006.01) | |
| *G06F 17/27* | (2006.01) | |
| *G06F 12/084* | (2016.01) | |
| *H04L 12/58* | (2006.01) | |
| *G06F 15/173* | (2006.01) | |
| *G06F 3/0481* | (2013.01) | |
| *G06F 3/0484* | (2013.01) | |
| *G06F 3/0485* | (2013.01) | |
| *G06F 12/02* | (2006.01) | |
| *G06F 9/45* | (2006.01) | |
| *H04L 29/08* | (2006.01) | |
| *G06F 3/06* | (2006.01) | |
| *G06F 11/14* | (2006.01) | |
| *H04L 29/06* | (2006.01) | |
| *G06F 9/445* | (2018.01) | |
| *H04L 12/18* | (2006.01) | |
| *H04L 29/12* | (2006.01) | |

(52) U.S. Cl.
CPC .......... *G06F 17/2235* (2013.01); *G06F 17/24* (2013.01); *G06F 17/246* (2013.01); *G06F 17/276* (2013.01); *G06F 17/2715* (2013.01); *G06F 17/30117* (2013.01); *G06F 17/30312* (2013.01); *G06F 17/30315* (2013.01); *G06F 17/30321* (2013.01); *G06F 17/30324* (2013.01); *G06F 17/30327* (2013.01); *G06F 17/30333* (2013.01); *G06F 17/30336* (2013.01); *G06F 17/30339* (2013.01); *G06F 17/30345* (2013.01); *G06F 17/30371* (2013.01); *G06F 17/30374* (2013.01); *G06F 17/30377* (2013.01); *G06F 17/30398* (2013.01); *G06F 17/30424* (2013.01); *G06F 17/30448* (2013.01); *G06F 17/30454* (2013.01); *G06F 17/30477* (2013.01); *G06F 17/30522* (2013.01); *G06F 17/30528* (2013.01); *G06F 17/30554* (2013.01); *G06F 17/30563* (2013.01); *G06F 17/30584* (2013.01); *G06F 17/30598* (2013.01); *G06F 17/30864* (2013.01); *G06F 17/30867* (2013.01); *G06F 17/30887* (2013.01); *G06F 17/30958* (2013.01); *G06F 17/30997* (2013.01); *H04L 12/18* (2013.01); *H04L 51/12* (2013.01); *H04L 61/2069* (2013.01); *H04L 63/101* (2013.01); *H04L 63/102* (2013.01); *H04L 67/1002* (2013.01); *H04L 67/34* (2013.01); *H04L 67/42* (2013.01); *H04L 69/16* (2013.01); *G06F 2201/805* (2013.01); *G06F 2201/84* (2013.01); *G06F 2212/60* (2013.01)

(56) References Cited

U.S. PATENT DOCUMENTS

| | | |
|---|---|---|
| 5,469,567 A | 11/1995 | Okada |
| 5,504,885 A | 4/1996 | Alashqur |
| 5,530,939 A | 6/1996 | Mansfield et al. |
| 5,568,632 A | 10/1996 | Nelson |
| 5,673,369 A | 9/1997 | Kim |
| 5,701,461 A | 12/1997 | Dalal et al. |
| 5,701,467 A | 12/1997 | Freeston |
| 5,764,953 A | 6/1998 | Collins et al. |
| 5,787,428 A | 7/1998 | Hart |
| 5,806,059 A | 9/1998 | Tsuchida et al. |
| 5,859,972 A | 1/1999 | Subramaniam et al. |
| 5,875,334 A | 2/1999 | Chow et al. |
| 5,878,415 A | 3/1999 | Olds |
| 5,890,167 A | 3/1999 | Bridge et al. |
| 5,899,990 A | 5/1999 | Maritzen et al. |
| 5,920,860 A | 7/1999 | Maheshwari et al. |
| 5,943,672 A | 8/1999 | Yoshida |
| 5,960,087 A | 9/1999 | Tribble et al. |
| 5,991,810 A | 11/1999 | Shapiro et al. |
| 5,999,918 A | 12/1999 | Williams et al. |
| 6,006,220 A | 12/1999 | Haderle et al. |
| 6,032,144 A | 2/2000 | Srivastava et al. |
| 6,032,148 A | 2/2000 | Wilkes |
| 6,038,563 A | 3/2000 | Bapat et al. |
| 6,058,394 A | 5/2000 | Bakow et al. |
| 6,061,684 A | 5/2000 | Glasser et al. |
| 6,138,112 A | 10/2000 | Slutz |
| 6,266,669 B1 | 7/2001 | Brodersen et al. |
| 6,289,357 B1 | 9/2001 | Parker |
| 6,292,803 B1 | 9/2001 | Richardson et al. |
| 6,304,876 B1 | 10/2001 | Isip |
| 6,317,728 B1 | 11/2001 | Kane |
| 6,327,702 B1 | 12/2001 | Sauntry et al. |
| 6,336,114 B1 | 1/2002 | Garrison |
| 6,353,819 B1 | 3/2002 | Edwards et al. |
| 6,367,068 B1 | 4/2002 | Vaidyanathan et al. |
| 6,389,414 B1 | 5/2002 | Delo et al. |
| 6,389,462 B1 | 5/2002 | Cohen et al. |
| 6,438,537 B1 | 8/2002 | Netz et al. |
| 6,446,069 B1 | 9/2002 | Yaung et al. |
| 6,460,037 B1 | 10/2002 | Weiss et al. |
| 6,473,750 B1 | 10/2002 | Petculescu et al. |
| 6,487,552 B1 | 11/2002 | Lei et al. |
| 6,496,833 B1 | 12/2002 | Goldberg et al. |
| 6,505,189 B1 | 1/2003 | Au et al. |
| 6,505,241 B2 | 1/2003 | Pitts |
| 6,510,551 B1 | 1/2003 | Miller |
| 6,530,075 B1 | 3/2003 | Beadle et al. |
| 6,538,651 B1 | 3/2003 | Hayman et al. |
| 6,546,402 B1 | 4/2003 | Beyer et al. |
| 6,553,375 B1 | 4/2003 | Huang et al. |
| 6,584,474 B1 | 6/2003 | Pereira |
| 6,604,104 B1 | 8/2003 | Smith |
| 6,618,720 B1 | 9/2003 | Au et al. |
| 6,631,374 B1 | 10/2003 | Klein et al. |
| 6,640,234 B1 | 10/2003 | Coffen et al. |
| 6,697,880 B1 | 2/2004 | Dougherty |
| 6,701,415 B1 | 3/2004 | Hendren |
| 6,714,962 B1 | 3/2004 | Helland et al. |
| 6,725,243 B2 | 4/2004 | Snapp |
| 6,732,100 B1 | 5/2004 | Brodersen et al. |
| 6,745,332 B1 | 6/2004 | Wong et al. |
| 6,748,374 B1 | 6/2004 | Madan et al. |
| 6,748,455 B1 | 6/2004 | Hinson et al. |
| 6,760,719 B1 | 7/2004 | Hanson et al. |
| 6,775,660 B2 | 8/2004 | Lin et al. |
| 6,785,668 B1 | 8/2004 | Polo et al. |
| 6,795,851 B1 | 9/2004 | Noy |
| 6,816,855 B2 | 11/2004 | Hartel et al. |
| 6,820,082 B1 | 11/2004 | Cook et al. |
| 6,829,620 B2 | 12/2004 | Michael et al. |
| 6,832,229 B2 | 12/2004 | Reed |
| 6,851,088 B1 | 2/2005 | Conner et al. |
| 6,882,994 B2 | 4/2005 | Yoshimura et al. |
| 6,925,472 B2 | 8/2005 | Kong |
| 6,934,717 B1 | 8/2005 | James |
| 6,947,928 B2 | 9/2005 | Dettinger et al. |
| 6,983,291 B1 | 1/2006 | Cochrane et al. |
| 6,985,895 B2 | 1/2006 | Witkowski et al. |
| 6,985,899 B2 | 1/2006 | Chan et al. |
| 6,985,904 B1 | 1/2006 | Kaluskar et al. |
| 7,020,649 B2 | 3/2006 | Cochrane et al. |
| 7,024,414 B2 | 4/2006 | Sah et al. |
| 7,031,962 B2 | 4/2006 | Moses |
| 7,058,657 B1 | 6/2006 | Berno |
| 7,089,228 B2 | 8/2006 | Arnold et al. |

(56) References Cited

U.S. PATENT DOCUMENTS

| | | |
|---|---|---|
| 7,089,245 B1 | 8/2006 | George et al. |
| 7,096,216 B2 | 8/2006 | Anonsen |
| 7,103,608 B1 | 9/2006 | Ozbutun et al. |
| 7,110,997 B1 | 9/2006 | Turkel et al. |
| 7,127,462 B2 | 10/2006 | Hiraga et al. |
| 7,146,357 B2 | 12/2006 | Suzuki et al. |
| 7,149,742 B1 | 12/2006 | Eastham et al. |
| 7,167,870 B2 | 1/2007 | Avvari et al. |
| 7,171,469 B2 | 1/2007 | Ackaouy et al. |
| 7,174,341 B2 | 2/2007 | Ghukasyan et al. |
| 7,181,686 B1 | 2/2007 | Bahrs |
| 7,188,105 B2 | 3/2007 | Dettinger et al. |
| 7,200,620 B2 | 4/2007 | Gupta |
| 7,216,115 B1 | 5/2007 | Walters et al. |
| 7,216,116 B1 | 5/2007 | Nilsson et al. |
| 7,219,302 B1 | 5/2007 | O'Shaughnessy et al. |
| 7,225,189 B1 | 5/2007 | McCormack et al. |
| 7,254,808 B2 | 8/2007 | Trappen et al. |
| 7,257,689 B1 | 8/2007 | Baird |
| 7,272,605 B1 | 9/2007 | Hinshaw et al. |
| 7,308,580 B2 | 12/2007 | Nelson et al. |
| 7,316,003 B1 * | 1/2008 | Dulepet ............... G06F 17/218 717/110 |
| 7,330,969 B2 | 2/2008 | Harrison et al. |
| 7,333,941 B1 | 2/2008 | Choi |
| 7,343,585 B1 | 3/2008 | Lau et al. |
| 7,350,237 B2 | 3/2008 | Vogel et al. |
| 7,380,242 B2 | 5/2008 | Alaluf |
| 7,401,088 B2 | 7/2008 | Chintakayala et al. |
| 7,426,521 B2 | 9/2008 | Harter |
| 7,430,549 B2 | 9/2008 | Zane et al. |
| 7,433,863 B2 | 10/2008 | Zane et al. |
| 7,447,865 B2 | 11/2008 | Uppala et al. |
| 7,478,094 B2 | 1/2009 | Ho et al. |
| 7,484,096 B1 | 1/2009 | Garg et al. |
| 7,493,311 B1 | 2/2009 | Cutsinger et al. |
| 7,529,734 B2 | 5/2009 | Dirisala |
| 7,529,750 B2 | 5/2009 | Bair |
| 7,542,958 B1 | 6/2009 | Warren et al. |
| 7,610,351 B1 | 10/2009 | Gollapudi et al. |
| 7,620,687 B2 | 11/2009 | Chen et al. |
| 7,624,126 B2 | 11/2009 | Pizzo et al. |
| 7,627,603 B2 | 12/2009 | Rosenblum et al. |
| 7,661,141 B2 | 2/2010 | Dutta et al. |
| 7,664,778 B2 | 2/2010 | Yagoub et al. |
| 7,672,275 B2 | 3/2010 | Yajnik et al. |
| 7,680,782 B2 | 3/2010 | Chen et al. |
| 7,711,716 B2 | 5/2010 | Stonecipher |
| 7,711,740 B2 | 5/2010 | Minore et al. |
| 7,761,444 B2 | 7/2010 | Zhang et al. |
| 7,797,356 B2 | 9/2010 | Iyer et al. |
| 7,827,204 B2 | 11/2010 | Heinzel et al. |
| 7,827,403 B2 | 11/2010 | Wong et al. |
| 7,827,523 B2 | 11/2010 | Ahmed et al. |
| 7,882,121 B2 | 2/2011 | Bruno et al. |
| 7,882,132 B2 | 2/2011 | Ghatare |
| 7,904,487 B2 | 3/2011 | Ghatare |
| 7,908,259 B2 | 3/2011 | Branscome et al. |
| 7,908,266 B2 | 3/2011 | Zeringue et al. |
| 7,930,412 B2 | 4/2011 | Yeap et al. |
| 7,966,311 B2 | 6/2011 | Haase |
| 7,966,312 B2 | 6/2011 | Nolan et al. |
| 7,966,343 B2 | 6/2011 | Yang et al. |
| 7,970,777 B2 | 6/2011 | Saxena et al. |
| 7,979,431 B2 | 7/2011 | Qazi et al. |
| 7,984,043 B1 | 7/2011 | Waas |
| 8,019,795 B2 | 9/2011 | Anderson et al. |
| 8,027,293 B2 | 9/2011 | Spaur et al. |
| 8,032,525 B2 | 10/2011 | Bowers et al. |
| 8,037,542 B2 | 10/2011 | Taylor et al. |
| 8,046,394 B1 | 10/2011 | Shatdal |
| 8,046,749 B1 | 10/2011 | Owen et al. |
| 8,055,672 B2 | 11/2011 | Djugash et al. |
| 8,060,484 B2 | 11/2011 | Bandera et al. |
| 8,171,018 B2 | 5/2012 | Zane et al. |
| 8,180,789 B1 | 5/2012 | Wasserman et al. |
| 8,196,121 B2 | 6/2012 | Peshansky et al. |
| 8,209,356 B1 | 6/2012 | Roesler |
| 8,286,189 B2 | 10/2012 | Kukreja et al. |
| 8,321,833 B2 | 11/2012 | Langworthy et al. |
| 8,332,435 B2 | 12/2012 | Ballard et al. |
| 8,359,305 B1 | 1/2013 | Burke et al. |
| 8,375,127 B1 | 2/2013 | Lita |
| 8,380,757 B1 | 2/2013 | Bailey et al. |
| 8,418,142 B2 | 4/2013 | Ao et al. |
| 8,433,701 B2 | 4/2013 | Sargeant et al. |
| 8,458,218 B2 | 6/2013 | Wildermuth |
| 8,473,897 B2 | 6/2013 | Box et al. |
| 8,478,713 B2 | 7/2013 | Cotner et al. |
| 8,515,942 B2 | 8/2013 | Marum et al. |
| 8,543,620 B2 | 9/2013 | Ching |
| 8,553,028 B1 | 10/2013 | Urbach |
| 8,555,263 B2 | 10/2013 | Allen et al. |
| 8,560,502 B2 | 10/2013 | Vora |
| 8,595,151 B2 | 11/2013 | Hao et al. |
| 8,601,016 B2 | 12/2013 | Briggs et al. |
| 8,631,034 B1 | 1/2014 | Peloski |
| 8,650,182 B2 | 2/2014 | Murthy |
| 8,660,869 B2 | 2/2014 | Macintyre et al. |
| 8,676,863 B1 | 3/2014 | Connell et al. |
| 8,683,488 B2 | 3/2014 | Kukreja et al. |
| 8,713,518 B2 | 4/2014 | Pointer et al. |
| 8,719,252 B2 | 5/2014 | Miranker et al. |
| 8,725,707 B2 | 5/2014 | Chen et al. |
| 8,726,254 B2 | 5/2014 | Rohde et al. |
| 8,745,014 B2 | 6/2014 | Travis |
| 8,745,510 B2 | 6/2014 | D'Alo' et al. |
| 8,751,823 B2 | 6/2014 | Myles et al. |
| 8,768,961 B2 | 7/2014 | Krishnamurthy |
| 8,788,254 B2 | 7/2014 | Peloski |
| 8,793,243 B2 | 7/2014 | Weyerhaeuser et al. |
| 8,805,947 B1 | 8/2014 | Kuzkin et al. |
| 8,806,133 B2 | 8/2014 | Hay et al. |
| 8,812,625 B1 | 8/2014 | Chitilian et al. |
| 8,838,656 B1 | 9/2014 | Cheriton |
| 8,855,999 B1 | 10/2014 | Elliot |
| 8,863,156 B1 | 10/2014 | Lepanto et al. |
| 8,874,512 B2 | 10/2014 | Jin et al. |
| 8,880,569 B2 | 11/2014 | Draper et al. |
| 8,880,787 B1 | 11/2014 | Kimmel et al. |
| 8,881,121 B2 | 11/2014 | Ali |
| 8,886,631 B2 | 11/2014 | Abadi et al. |
| 8,903,717 B2 | 12/2014 | Elliot |
| 8,903,842 B2 | 12/2014 | Bloesch et al. |
| 8,922,579 B2 | 12/2014 | Mi et al. |
| 8,924,384 B2 | 12/2014 | Driesen et al. |
| 8,930,892 B2 | 1/2015 | Pointer et al. |
| 8,954,418 B2 | 2/2015 | Faerber et al. |
| 8,959,495 B2 | 2/2015 | Chafi et al. |
| 8,996,864 B2 | 3/2015 | Maigne et al. |
| 9,031,930 B2 | 5/2015 | Valentin |
| 9,077,611 B2 * | 7/2015 | Cordray ............. H04L 41/0213 |
| 9,195,712 B2 | 11/2015 | Freedman et al. |
| 9,298,768 B2 | 3/2016 | Varakin et al. |
| 9,311,357 B2 | 4/2016 | Ramesh et al. |
| 9,372,671 B2 | 6/2016 | Balan et al. |
| 9,384,184 B2 | 7/2016 | Cervantes et al. |
| 2002/0002576 A1 | 1/2002 | Wollrath et al. |
| 2002/0007331 A1 | 1/2002 | Lo et al. |
| 2002/0054587 A1 | 5/2002 | Baker et al. |
| 2002/0065981 A1 | 5/2002 | Jenne et al. |
| 2002/0156722 A1 | 10/2002 | Greenwood |
| 2003/0004952 A1 | 1/2003 | Nixon et al. |
| 2003/0061216 A1 | 3/2003 | Moses |
| 2003/0074400 A1 | 4/2003 | Brooks et al. |
| 2003/0110416 A1 | 6/2003 | Morrison et al. |
| 2003/0167261 A1 | 9/2003 | Grust et al. |
| 2003/0182261 A1 | 9/2003 | Patterson |
| 2003/0208484 A1 | 11/2003 | Chang et al. |
| 2003/0208505 A1 | 11/2003 | Mullins et al. |
| 2003/0233632 A1 | 12/2003 | Aigen et al. |
| 2004/0002961 A1 | 1/2004 | Dettinger et al. |
| 2004/0076155 A1 | 4/2004 | Yajnik et al. |
| 2004/0111492 A1 | 6/2004 | Nakahara et al. |

(56) References Cited

U.S. PATENT DOCUMENTS

| | | |
|---|---|---|
| 2004/0148630 A1 | 7/2004 | Choi |
| 2004/0186813 A1 | 9/2004 | Tedesco et al. |
| 2004/0216150 A1 | 10/2004 | Scheifler et al. |
| 2004/0220923 A1 | 11/2004 | Nica |
| 2004/0254876 A1 | 12/2004 | Coval et al. |
| 2005/0015490 A1 | 1/2005 | Saare et al. |
| 2005/0060693 A1 | 3/2005 | Robison et al. |
| 2005/0097447 A1 | 5/2005 | Serra et al. |
| 2005/0102284 A1 | 5/2005 | Srinivasan et al. |
| 2005/0102636 A1 | 5/2005 | McKeon et al. |
| 2005/0131893 A1 | 6/2005 | Glan |
| 2005/0132384 A1 | 6/2005 | Morrison et al. |
| 2005/0138624 A1 | 6/2005 | Morrison et al. |
| 2005/0165866 A1 | 7/2005 | Bohannon et al. |
| 2005/0198001 A1 | 9/2005 | Cunningham et al. |
| 2006/0059253 A1 | 3/2006 | Goodman et al. |
| 2006/0074901 A1 | 4/2006 | Pirahesh et al. |
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dettinger et al. |
| 2006/0116999 A1 | 6/2006 | Dettinger et al. |
| 2006/0136361 A1 | 6/2006 | Peri et al. |
| 2006/0173693 A1 | 8/2006 | Arazi et al. |
| 2006/0195460 A1 | 8/2006 | Nori et al. |
| 2006/0212847 A1 | 9/2006 | Tarditi et al. |
| 2006/0218123 A1 | 9/2006 | Chowdhuri et al. |
| 2006/0218200 A1 | 9/2006 | Factor et al. |
| 2006/0230016 A1 | 10/2006 | Cunningham et al. |
| 2006/0253311 A1 | 11/2006 | Yin et al. |
| 2006/0271510 A1 | 11/2006 | Harward et al. |
| 2006/0277162 A1 | 12/2006 | Smith |
| 2007/0011211 A1 | 1/2007 | Reeves et al. |
| 2007/0027884 A1 | 2/2007 | Heger et al. |
| 2007/0033518 A1 | 2/2007 | Kenna et al. |
| 2007/0073765 A1 | 3/2007 | Chen |
| 2007/0101252 A1 | 5/2007 | Chamberlain et al. |
| 2007/0169003 A1* | 7/2007 | Branda ............... G06F 11/3409 717/130 |
| 2007/0256060 A1 | 11/2007 | Ryu et al. |
| 2007/0258508 A1 | 11/2007 | Werb et al. |
| 2007/0271280 A1 | 11/2007 | Chandasekaran |
| 2007/0299822 A1 | 12/2007 | Jopp et al. |
| 2008/0022136 A1 | 1/2008 | Mattsson et al. |
| 2008/0033907 A1 | 2/2008 | Woehler et al. |
| 2008/0046804 A1 | 2/2008 | Rui et al. |
| 2008/0072150 A1* | 3/2008 | Chan .................... G06F 3/0481 715/708 |
| 2008/0120283 A1 | 5/2008 | Liu et al. |
| 2008/0155565 A1 | 6/2008 | Poduri |
| 2008/0168135 A1 | 7/2008 | Redlich et al. |
| 2008/0235238 A1 | 9/2008 | Jalobeanu et al. |
| 2008/0263179 A1 | 10/2008 | Buttner et al. |
| 2008/0276241 A1 | 11/2008 | Bajpai et al. |
| 2008/0319951 A1 | 12/2008 | Ueno et al. |
| 2009/0019029 A1 | 1/2009 | Tommaney et al. |
| 2009/0022095 A1 | 1/2009 | Spaur et al. |
| 2009/0037391 A1 | 2/2009 | Agrawal et al. |
| 2009/0055370 A1 | 2/2009 | Dagum et al. |
| 2009/0083215 A1 | 3/2009 | Burger |
| 2009/0089312 A1 | 4/2009 | Chi et al. |
| 2009/0248902 A1 | 10/2009 | Blue |
| 2009/0254516 A1 | 10/2009 | Meiyyappan et al. |
| 2009/0300770 A1 | 12/2009 | Rowney et al. |
| 2009/0319058 A1 | 12/2009 | Rovaglio et al. |
| 2009/0319484 A1 | 12/2009 | Golbandi et al. |
| 2009/0327242 A1 | 12/2009 | Brown et al. |
| 2010/0036801 A1 | 2/2010 | Pirvali et al. |
| 2010/0047760 A1 | 2/2010 | Best et al. |
| 2010/0049715 A1 | 2/2010 | Jacobsen et al. |
| 2010/0161555 A1 | 6/2010 | Nica et al. |
| 2010/0186082 A1 | 7/2010 | Ladki et al. |
| 2010/0199161 A1 | 8/2010 | Aureglia et al. |
| 2010/0205017 A1 | 8/2010 | Sichelman et al. |
| 2010/0205351 A1 | 8/2010 | Wiener et al. |
| 2010/0281005 A1 | 11/2010 | Carlin et al. |
| 2010/0281071 A1 | 11/2010 | Ben-Zvi et al. |
| 2011/0126110 A1 | 5/2011 | Vilke et al. |
| 2011/0126154 A1 | 5/2011 | Boehler et al. |
| 2011/0153603 A1 | 6/2011 | Adiba et al. |
| 2011/0161378 A1 | 6/2011 | Williamson |
| 2011/0167020 A1 | 7/2011 | Yang et al. |
| 2011/0178984 A1 | 7/2011 | Talius et al. |
| 2011/0194563 A1 | 8/2011 | Shen et al. |
| 2011/0314019 A1 | 12/2011 | Peris |
| 2012/0110030 A1 | 5/2012 | Pomponio |
| 2012/0144234 A1 | 6/2012 | Clark et al. |
| 2012/0159303 A1 | 6/2012 | Friedrich et al. |
| 2012/0191446 A1 | 7/2012 | Binsztok et al. |
| 2012/0192096 A1 | 7/2012 | Bowman et al. |
| 2012/0197868 A1 | 8/2012 | Fauser et al. |
| 2012/0209886 A1 | 8/2012 | Henderson |
| 2012/0215741 A1 | 8/2012 | Poole et al. |
| 2012/0221528 A1 | 8/2012 | Renkes |
| 2012/0246052 A1 | 9/2012 | Taylor et al. |
| 2012/0254143 A1 | 10/2012 | Varma et al. |
| 2012/0259759 A1 | 10/2012 | Crist et al. |
| 2012/0296846 A1 | 11/2012 | Teeter |
| 2013/0041946 A1 | 2/2013 | Joel et al. |
| 2013/0080514 A1 | 3/2013 | Gupta et al. |
| 2013/0086107 A1 | 4/2013 | Genochio et al. |
| 2013/0166556 A1 | 6/2013 | Baeumges et al. |
| 2013/0173667 A1 | 7/2013 | Soderberg et al. |
| 2013/0179460 A1 | 7/2013 | Cervantes et al. |
| 2013/0185619 A1 | 7/2013 | Ludwig |
| 2013/0191370 A1 | 7/2013 | Chen et al. |
| 2013/0198232 A1* | 8/2013 | Shamgunov ...... G06F 17/30545 707/770 |
| 2013/0226959 A1 | 8/2013 | Dittrich et al. |
| 2013/0246560 A1 | 9/2013 | Feng et al. |
| 2013/0263123 A1 | 10/2013 | Zhou et al. |
| 2013/0290243 A1 | 10/2013 | Hazel et al. |
| 2013/0304725 A1 | 11/2013 | Nee et al. |
| 2013/0304744 A1 | 11/2013 | McSherry et al. |
| 2013/0311352 A1 | 11/2013 | Kayanuma et al. |
| 2013/0311488 A1 | 11/2013 | Erdogan et al. |
| 2013/0318129 A1 | 11/2013 | Vingralek et al. |
| 2013/0346365 A1 | 12/2013 | Kan et al. |
| 2014/0019494 A1 | 1/2014 | Tang |
| 2014/0040203 A1 | 2/2014 | Lu et al. |
| 2014/0059646 A1 | 2/2014 | Hannel et al. |
| 2014/0082724 A1 | 3/2014 | Pearson et al. |
| 2014/0136521 A1 | 5/2014 | Pappas |
| 2014/0143123 A1 | 5/2014 | Banke et al. |
| 2014/0149997 A1 | 5/2014 | Kukreja et al. |
| 2014/0156618 A1 | 6/2014 | Castellano |
| 2014/0173023 A1 | 6/2014 | Varney et al. |
| 2014/0181036 A1 | 6/2014 | Dhamankar et al. |
| 2014/0181081 A1 | 6/2014 | Veldhuizen |
| 2014/0188924 A1 | 7/2014 | Ma et al. |
| 2014/0195558 A1 | 7/2014 | Murthy et al. |
| 2014/0201194 A1 | 7/2014 | Reddy et al. |
| 2014/0215446 A1 | 7/2014 | Araya et al. |
| 2014/0222768 A1 | 8/2014 | Rambo et al. |
| 2014/0229506 A1 | 8/2014 | Lee |
| 2014/0229874 A1 | 8/2014 | Strauss |
| 2014/0244687 A1 | 8/2014 | Shmueli et al. |
| 2014/0279810 A1 | 9/2014 | Mann et al. |
| 2014/0280522 A1 | 9/2014 | Watte |
| 2014/0282227 A1 | 9/2014 | Nixon et al. |
| 2014/0282444 A1 | 9/2014 | Araya et al. |
| 2014/0282540 A1 | 9/2014 | Bonnet et al. |
| 2014/0297611 A1 | 10/2014 | Abbour et al. |
| 2014/0317084 A1 | 10/2014 | Chaudhry et al. |
| 2014/0324821 A1 | 10/2014 | Meiyyappan et al. |
| 2014/0330700 A1 | 11/2014 | Studnitzer et al. |
| 2014/0330807 A1 | 11/2014 | Weyerhaeuser et al. |
| 2014/0344186 A1 | 11/2014 | Nadler |
| 2014/0344391 A1 | 11/2014 | Varney et al. |
| 2014/0359574 A1 | 12/2014 | Beckwith et al. |
| 2014/0372482 A1 | 12/2014 | Martin et al. |
| 2014/0380051 A1 | 12/2014 | Edward et al. |
| 2015/0019516 A1 | 1/2015 | Wein et al. |
| 2015/0026155 A1 | 1/2015 | Martin |

(56) References Cited

U.S. PATENT DOCUMENTS

| | | | |
|---|---|---|---|
| 2015/0067640 | A1 | 3/2015 | Booker et al. |
| 2015/0074066 | A1 | 3/2015 | Li et al. |
| 2015/0082218 | A1 | 3/2015 | Affoneh et al. |
| 2015/0088894 | A1 | 3/2015 | Czarlinska et al. |
| 2015/0095381 | A1 | 4/2015 | Chen et al. |
| 2015/0127599 | A1 | 5/2015 | Schiebeler |
| 2015/0172117 | A1 | 6/2015 | Dolinsky et al. |
| 2015/0188778 | A1 | 7/2015 | Asayag et al. |
| 2015/0205588 | A1 | 7/2015 | Bates et al. |
| 2015/0254298 | A1 | 9/2015 | Bourbonnais et al. |
| 2015/0304182 | A1 | 10/2015 | Brodsky et al. |
| 2015/0317359 | A1 | 11/2015 | Tran et al. |
| 2016/0026442 | A1 | 1/2016 | Chhaparia |
| 2016/0065670 | A1 | 3/2016 | Kimmel et al. |
| 2016/0125018 | A1 | 5/2016 | Tomoda et al. |
| 2016/0253294 | A1 | 9/2016 | Allen et al. |

FOREIGN PATENT DOCUMENTS

| | | |
|---|---|---|
| EP | 1198769 B1 | 6/2008 |
| EP | 2199961 A1 | 6/2010 |
| EP | 2423816 A1 | 2/2012 |
| EP | 2743839 A1 | 6/2014 |
| RU | 2421798 | 6/2011 |
| WO | 2000000879 A2 | 1/2000 |
| WO | 2001079964 A2 | 10/2001 |
| WO | 2011120161 A1 | 10/2011 |
| WO | 2012136627 A1 | 10/2012 |
| WO | 2014026220 A1 | 2/2014 |
| WO | 2014143208 A1 | 9/2014 |

OTHER PUBLICATIONS

International Search Report and Written Opinion dated Jul. 28, 2016, in International Appln. No. PCT/US2016/032589 filed May 14, 2016.

International Search Report and Written Opinion dated Sep. 1, 2016, in International Appln. No. PCT/US2016/032596 filed May 14, 2016.

International Search Report and Written Opinion dated Sep. 1, 2016, in International Appln. No. PCT/US2016/032598 filed May 14, 2016.

International Search Report and Written Opinion dated Sep. 1, 2016, in International Appln. No. PCT/US2016/032601 filed May 14, 2016.

International Search Report and Written Opinion dated Sep. 1, 2016, in International Appln. No. PCT/US2016/032602 filed May 14, 2016.

International Search Report and Written Opinion dated Sep. 1, 2016, in International Appln. No. PCT/US2016/032607 filed May 14, 2016.

International Search Report and Written Opinion dated Sep. 15, 2016, in International Appln. No. PCT/US2016/032591 filed May 14, 2016.

International Search Report and Written Opinion dated Sep. 15, 2016, in International Appln. No. PCT/US2016/032594 filed May 14, 2016.

International Search Report and Written Opinion dated Sep. 15, 2016, in International Appln. No. PCT/US2016/032600 filed May 14, 2016.

International Search Report and Written Opinion dated Sep. 29, 2016, in International Appln. No. PCT/US2016/032595 filed May 14, 2016.

International Search Report and Written Opinion dated Sep. 29, 2016, in International Appln. No. PCT/US2016/032606 filed May 14, 2016.

International Search Report and Written Opinion dated Sep. 8, 2016, in International Appln. No. PCT/US2016/032603 filed May 14, 2016.

International Search Report and Written Opinion dated Sep. 8, 2016, in International Appln. No. PCT/US2016/032604 filed May 14, 2016.

Jellema, Lucas. "Implementing Cell Highlighting in JSF-based Rich Enterprise Apps (Part 1)", dated Nov. 2008. Retrieved from http://www.oracle.com/technetwork/articles/adf/jellema-adfcellhighlighting-087850.html (last accessed Jun. 16, 2016).

Lou, Yuan. "A Multi-Agent Decision Support System for Stock Trading", IEEE Network, Jan./Feb. 2002. Retreived from http://www.reading.ac.uk/AcaDepts/si/sisweb13/ais/papers/journal12-A%20multi-agent%20Framework.pdf.

Mallet, "Relational Database Support for Spatio-Temporal Data", Technical Report TR 04-21, Sep. 2004, University of Alberta, Department of Computing Science.

Mariyappan, Balakrishnan. "10 Useful Linux Bash_Completion Complete Command Examples (Bash Command Line Completion on Steroids)", dated Dec. 2, 2013. Retrieved from http://www.thegeekstuff.com/2013/12/bash-completion-complete/ (last accessed Jun. 16, 2016).

Murray, Derek G. et al. "Naiad: a timely dataflow system." SOSP '13 Proceedings of the Twenty-Fourth ACM Symposium on Operating Systems Principles. pp. 439-455. Nov. 2013.

Non-final Office Action dated Apr. 19, 2017, in U.S. Appl. No. 15/154,974.

Non-final Office Action dated Aug. 12, 2016, in U.S. Appl. No. 15/155,001.

Non-final Office Action dated Aug. 16, 2016, in U.S. Appl. No. 15/154,993.

Non-final Office Action dated Aug. 19, 2016, in U.S. Appl. No. 15/154,991.

Non-final Office Action dated Aug. 25, 2016, in U.S. Appl. No. 15/154,980.

Non-final Office Action dated Aug. 26, 2016, in U.S. Appl. No. 15/154,995.

Non-final Office Action dated Aug. 8, 2016, in U.S. Appl. No. 15/154,983.

Non-final Office Action dated Aug. 8, 2016, in U.S. Appl. No. 15/154,985.

Non-final Office Action dated Feb. 8, 2017, in U.S. Appl. No. 15/154,997.

Non-final Office Action dated Mar. 2, 2017, in U.S. Appl. No. 15/154,984.

Non-final Office Action dated Nov. 17, 2016, in U.S. Appl. No. 15/154,999.

Non-final Office Action dated Oct. 13, 2016, in U.S. Appl. No. 15/155,009.

Non-final Office Action dated Oct. 27, 2016, in U.S. Appl. No. 15/155,006.

Non-final Office Action dated Oct. 7, 2016, in U.S. Appl. No. 15/154,998.

Non-final Office Action dated Sep. 1, 2016, in U.S. Appl. No. 15/154,979.

Non-final Office Action dated Sep. 1, 2016, in U.S. Appl. No. 15/155,011.

Non-final Office Action dated Sep. 1, 2016, in U.S. Appl. No. 15/155,012.

Non-final Office Action dated Sep. 14, 2016, in U.S. Appl. No. 15/154,984.

Non-final Office Action dated Sep. 16, 2016, in U.S. Appl. No. 15/154,988.

Non-final Office Action dated Sep. 22, 2016, in U.S. Appl. No. 15/154,987.

Non-final Office Action dated Sep. 26, 2016, in U.S. Appl. No. 15/155,005.

Non-final Office Action dated Sep. 29, 2016, in U.S. Appl. No. 15/154,990.

Non-final Office Action dated Sep. 8, 2016, in U.S. Appl. No. 15/154,975.

Non-final Office Action dated Sep. 9, 2016, in U.S. Appl. No. 15/154,996.

Non-final Office Action dated Sep. 9, 2016, in U.S. Appl. No. 15/155,010.

(56) References Cited

OTHER PUBLICATIONS

Notice of Allowance dated Dec. 19, 2016, in U.S. Appl. No. 15/155,001.
Notice of Allowance dated Dec. 22, 2016, in U.S. Appl. No. 15/155,011.
Notice of Allowance dated Dec. 7, 2016, in U.S. Appl. No. 15/154,985.
Notice of Allowance dated Feb. 1, 2017, in U.S. Appl. No. 15/154,988.
Notice of Allowance dated Feb. 14, 2017, in U.S. Appl. No. 15/154,979.
Notice of Allowance dated Feb. 28, 2017, in U.S. Appl. No. 15/154,990.
Notice of Allowance dated Jan. 30, 2017, in U.S. Appl. No. 15/154,987.
Notice of Allowance dated Jun. 19, 2017, in U.S. Appl. No. 15/154,980.
Notice of Allowance dated Jun. 20, 2017, in U.S. Appl. No. 15/154,975.
Notice of Allowance dated Mar. 2, 2017, in U.S. Appl. No. 15/154,998.
Notice of Allowance dated Mar. 31, 2017, in U.S. Appl. No. 15/154,998.
Notice of Allowance dated May 10, 2017, in U.S. Appl. No. 15/154,988.
Notice of Allowance dated Nov. 17, 2016, in U.S. Appl. No. 15/154,991.
Notice of Allowance dated Nov. 21, 2016, in U.S. Appl. No. 15/154,983.
Notice of Allowance dated Nov. 8, 2016, in U.S. Appl. No. 15/155,007.
Notice of Allowance dated Oct. 11, 2016, in U.S. Appl. No. 15/155,007.
Notice of Allowance dated Oct. 21, 2016, in U.S. Appl. No. 15/154,999.
Palpanas, Themistoklis et al. "Incremental Maintenance for Non-Distributive Aggregate Functions", Proceedings of the 28th VLDB Conference, 2002. Retreived from http://www.vldb.org/conf/2002/S22P04.pdf.
PowerShell Team, Intellisense in Windows PowerShell ISE 3.0, dated Jun. 12, 2012, Windows PowerShell Blog, pp. 1-6 Retrieved: https://blogs.msdn.microsoft.com/powershell/2012/06/12/intel-lisense-in-windows-powershell-ise-3-0/.
Smith, Ian. "Guide to Using SQL: Computed and Automatic Columns." Rdb Jornal, dated Sep. 2008, retrieved Aug. 15, 2016, retrieved from the Internet <URL: http://www.oracle.com/technetwork/products/rdb/automatic-columns-132042.pdf>.
Wes McKinney & PyData Development Team. "pandas: powerful Python data analysis toolkit, Release 0.16.1" Dated May 11, 2015. Retrieved from: http://pandas.pydata.org/pandas-docs/version/0.16.1/index.html.
Wes McKinney & PyData Development Team. "pandas: powerful Python data analysis toolkit, Release 0.18.1" Dated May 3, 2016. Retrieved from: http://pandas.pydata.org/pandas-docs/version/0.18.1/index.html.
Wu, Buwen et al. "Scalable SPARQL Querying using Path Partitioning", 31st IEEE International Conference on Data Engineering (ICDE 2015), Seoul, Korea, Apr. 13-17, 2015. Retreived from http://imada.sdu.dk/~zhou/papers/icde2015.pdf.
"About Entering Commands in the Command Window", dated Dec. 16, 2015. Retrieved from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html(last accessed Jun. 16, 2016).
"Change Data Capture", Oracle Database Online Documentation 11g Release 1 (11.1), dated Apr. 5, 2016. Retrieved from https://web.archive.org/web/20160405032625/http://docs.oracle.com/cd/B28359_01/server.111/b28313/cdc.htm.
"Chapter 24. Query access plans", Tuning Database Performance, DB2 Version 9.5 for Linux, UNIX, and Windows, pp. 301-462, dated Dec. 2010. Retreived from http://public.dhe.ibm.com/ps/products/db2/info/vr95/pdf/en_US/DB2PerfTuneTroubleshoot-db2d3e953.pdf.
"GNU Emacs Manual", dated Apr. 15, 2016, pp. 43-47. Retrieved from https://web.archive.org/web/20160415175915/http://www.gnu.org/software/emacs/manual/html_mono/emacs.html.
"Google Protocol RPC Library Overview", dated Apr. 27, 2016. Retrieved from https://cloud.google.com/appengine/docs/python/tools/protorpc/ (last accessed Jun. 16, 2016).
"IBM—What is HBase?", dated Sep. 6, 2015. Retrieved from https://web.archive.org/web/20150906022050/http://www-01.ibm.com/software/data/infosphere/hadoop/hbase/.
"IBM Informix TimeSeries data management", dated Jan. 18, 2016. Retrieved from https://web.archive.org/web/20160118072141/http://www-01.ibm.com/software/data/informix/timeseries/.
"IBM InfoSphere BigInsights 3.0.0—Importing data from and exporting data to DB2 by using Sqoop", dated Jan. 15, 2015. Retrieved from https://web.archive.org/web/20150115034058/http://www-01.ibm.com/support/knowledgecenter/SSPT3X_3.0.0/com.ibm.swg.im.infosphere.biginsights.import.doc/doc/data_warehouse_sqoop.html.
"Maximize Data Value with Very Large Database Management by SAP Sybase IQ", dated 2013. Retreived from http://www.sap.com/bin/sapcom/en_us/downloadasset.2013-06-jun-11-11.maximize-data-value-with-very-large-database-management-by-sap-sybase-iq-pdf.html.
"Microsoft Azure—Managing Access Control Lists (ACLs) for Endpoints by using PowerShell", dated Nov. 12, 2014. Retrieved from https://web.archive.org/web/20150110170715/http://msdn.microsoft.com/en-us/library/azure/dn376543.aspx.
"Oracle Big Data Appliance—Perfect Balance Java API", dated Sep. 20, 2015. Retrieved from https://web.archive.org/web/20131220040005/http://docs.oracle.com/cd/E41604_01/doc.22/e41667/toc.htm.
"Oracle Big Data Appliance—X5-2", dated Sep. 6, 2015. Retrieved from https://web.archive.org/web/20150906185409/http://www.oracle.com/technetwork/database/bigdata-appliance/overview/bigdataappliance-datasheet-1883358.pdf.
"Oracle Big Data Appliance Software User's Guide", dated Feb. 2015. Retrieved from https://docs.oracle.com/cd/E55905_01/doc.40/e55814.pdf.
"SAP HANA Administration Guide", dated Mar. 29, 2016, pp. 290-294. Retrieved from https://web.archive.org/web/20160417053656/http://help.sap.com/hana/SAP_HANA_Administration_Guide_en.pdf.
"Sophia Database—Architecture", dated Jan. 18, 2016. Retrieved from https://web.archive.org/web/20160118052919/http://sphia.org/architecture.html.
"Tracking Data Changes", SQL Server 2008 R2, dated Sep. 22, 2015. Retrieved from https://web.archive.org/web/20150922000614/https://technet.microsoft.com/en-us/library/bb933994(v=sql.105).aspx.
"Use Formula AutoComplete", dated 2010. Retrieved from https://support.office.com/en-us/article/Use-Formula-AutoComplete-c7c46fa6-3a94-4150-a2f7-34140c1ee4d9 (last accessed Jun. 16, 2016).
Adelfio et al. "Schema Extraction for Tabular Data on the Web", Proceedings of the VLDB Endowment, vol. 6, No. 6. Apr. 2013. Retrieved from http://www.cs.umd.edu/~hjs/pubs/spreadsheets-vldb13.pdf.
Advisory Action dated Apr. 19, 2017, in U.S. Appl. No. 15/154,999.
Advisory Action dated Apr. 20, 2017, in U.S. Appl. No. 15/154,980.
Advisory Action dated Apr. 6, 2017, in U.S. Appl. No. 15/154,995.
Advisory Action dated Mar. 31, 2017, in U.S. Appl. No. 15/154,996.
Advisory Action dated May 3, 2017, in U.S. Appl. No. 15/154,993.
Borror, Jefferey A. "Q for Mortals 2.0", dated Nov. 1, 2011. Retreived from http://code.kx.com/wiki/JB:QforMortals2/contents.
Cheusheva, Svetlana. "How to change the row color based on a cell's value in Excel", dated Oct. 29, 2013. Retrieved from https://www.ablebits.com/office-addins-blog/2013/10/29/excel-change-row-background-color/ (last accessed Jun. 16, 2016).
Corrected Notice of Allowability dated Mar. 10, 2017, in U.S. Appl. No. 15/154,979.

(56) References Cited

OTHER PUBLICATIONS

Ex Parte Quayle Action dated Aug. 8, 2016, in U.S. Appl. No. 15/154,999.
Final Office Action dated Apr. 10, 2017, in U.S. Appl. No. 15/155,006.
Final Office Action dated Dec. 19, 2016, in U.S. Appl. No. 15/154,995.
Final Office Action dated Feb. 24, 2017, in U.S. Appl. No. 15/154,993.
Final Office Action dated Jan. 27, 2017, in U.S. Appl. No. 15/154,980.
Final Office Action dated Jan. 31, 2017, in U.S. Appl. No. 15/154,996.
Final Office Action dated Jun. 23, 2017, in U.S. Appl. No. 15/154,997.
Final Office Action dated Mar. 1, 2017, in U.S. Appl. No. 15/154,975.
Final Office Action dated Mar. 13, 2017, in U.S. Appl. No. 15/155,012.
Final Office Action dated Mar. 31, 2017, in U.S. Appl. No. 15/155,005.
Final Office Action dated May 15, 2017, in U.S. Appl. No. 15/155,010.
Final Office Action dated May 4, 2017, in U.S. Appl. No. 15/155,009.
Gai, Lei et al. "An Efficient Summary Graph Driven Method for RDF Query Processing", dated Oct. 27, 2015. Retreived from http://arxiv.org/pdf/1510.07749.pdf.
International Search Report and Written Opinion dated Aug. 18, 2016, in International Appl. No. PCT/US2016/032582 filed May 14, 2016.
International Search Report and Written Opinion dated Aug. 18, 2016, in International Appln. No. PCT/US2016/032584 filed May 14, 2016.
International Search Report and Written Opinion dated Aug. 18, 2016, in International Appln. No. PCT/US2016/032588 filed May 14, 2016.
International Search Report and Written Opinion dated Aug. 18, 2016, in International Appln. No. PCT/US2016/032593 filed May 14, 2016.
International Search Report and Written Opinion dated Aug. 18, 2016, in International Appln. No. PCT/US2016/032597 filed May 14, 2016.
International Search Report and Written Opinion dated Aug. 18, 2016, in International Appln. No. PCT/US2016/032599 filed May 14, 2016.
International Search Report and Written Opinion dated Aug. 18, 2016, in International Appln. No. PCT/US2016/032605 filed May 14, 2016.
International Search Report and Written Opinion dated Aug. 25, 2016, in International Appln. No. PCT/US2016/032590 filed May 14, 2016.
International Search Report and Written Opinion dated Aug. 25, 2016, in International Appln. No. PCT/US2016/032592 filed May 14, 2016.
International Search Report and Written Opinion dated Aug. 4, 2016, in International Appln. No. PCT/US2016/032581 filed May 14, 2016.
International Search Report and Written Opinion dated Jul. 28, 2016, in International Appln. No. PCT/US2016/032586 filed May 14, 2016.

* cited by examiner

US 9,898,496 B2

DYNAMIC CODE LOADING

This application claims the benefit of U.S. Provisional Application No. 62/161,813, entitled "Computer Data System" and filed on May 14, 2015, which is incorporated herein by reference in its entirety.

Embodiments relate generally to computer data systems, and more particularly, to methods, systems and computer readable media for dynamic code loading.

Some conventional computer data systems may provide little or no ability to alter software instructions once an application has been built (e.g., compiled, linked, etc.). A user may have a need or desire to alter functionality of a process within a computer data system while not affecting other users or processes within the system. A need may exist for a dynamically loading code to a process (e.g., a remote query processor within a query dispatch/execution architecture) such that the dynamically loaded code does not affect other processes operating within the same computer data system. Also, a need may exist to dynamically load code for a process while that process is executing a query.

Further, a need may exist to permit multiple versions of a data system to run in parallel using the same or similar source data. A need may exist to permit users to implement and deploy custom code without impacting other users. Also, a need may exist to permit rapid deployment of new features/bug fixes to all or a subset of users without a completely new system deployment.

Embodiments were conceived in light of the above mentioned needs, problems and/or limitations, among other things.

Some implementations can include computer data system providing dynamic code loading within a query dispatch and execution architecture, the system can comprise one or more processors, and computer readable storage coupled to the one or more processors, the computer readable storage having stored thereon instructions that, when executed by the one or more processors, cause the one or more processors to perform operations. The operations can include providing, from a client computer system, first dynamic code for execution by a remote query processor within a remote query server computer system, where the remote query processor includes an executable code environment established according to request parameters provided by a primary client on the client computer system and where the remote query processor is dedicated for processing one or more queries from the primary client, and making the first dynamic code available to the remote query processor. The operations can also include loading the first dynamic code at the remote query processor, and accessing, at the remote query processor, one or more data system query tasks sent from the primary client. The operations can further include executing, at the remote query processor, the one or more data system query tasks using an initial code deployment and the first dynamic code.

The operations can also include providing, from the client, second dynamic code while the executing is being performed by the remote query processor, and making the second dynamic code available to the remote query processor. The operations can further include loading the second dynamic code at the remote query processor, and continuing executing the one or more query tasks at the remote query processor using the initial code deployment, the first dynamic code and the second dynamic code.

The first dynamic code can include code executable by one or more virtual machines and the second dynamic code includes code executable by the one or more virtual machines. The first dynamic code or the second dynamic code can override a portion of the initial code deployment. The first dynamic code or the second dynamic code can add one or more functions to the initial code deployment.

Making the first dynamic code available to the remote query processor can include persisting the first dynamic code on a server host at a URL forming part of a classpath of a virtual machine of the remote query processor. Making the first dynamic code available to the remote query processor can include persisting on a server host at a URL that will be searched by a class loader of the remote query processor at runtime.

The first dynamic code includes a data system query language portion, and wherein the executing can include parsing the query language portion into computer code, compiling the computer code into executable code configured to be executable on a virtual machine, and executing the executable code on the virtual machine.

Some implementations can include a method that can include providing, from a client, first code for execution by a remote query processor, where the remote query processor includes an executable code environment established according to request parameters provided by the client and where the remote query processor is dedicated for processing one or more queries from the client. The method can also include making the first code available to the remote query processor, and loading the first code at the remote query processor. The method can further include receiving, at the remote query processor, one or more data system query tasks sent from the client, and executing, at the remote query processor, the one or more query tasks using an initial code deployment and the first code.

The method can also include providing, from the client, second code while the executing is being performed by the remote query processor, and making the second code available to the remote query processor. The method can further include loading the second code at the remote query processor, and continuing executing the one or more query tasks at the remote query processor using the initial code deployment, the first code and the second code.

The first code can include code executable by a virtual machine and the second code includes code executable by the virtual machine. The first code or the second code can override a portion of the initial code deployment. The first code or the dynamic code can add one or more functions to the initial code deployment.

Making the first code available to the remote query processor can include persisting the first code on a server host at a URL forming part of a classpath of a virtual machine of the remote query processor. Making the first code available to the remote query processor can include persisting the first code on a server host at a URL that will be searched by a class loader of the remote query processor at runtime.

The second code can include a data system query language portion, and the executing can include parsing the query language portion into computer code, compiling the computer code into executable code configured to be executable on a virtual machine, and executing the executable code on the virtual machine.

Some implementations can include a method that can include providing, from a client, second code before or during execution of first code being performed by a remote query processor, where the remote query processor includes an executable code environment established according to request parameters provided by the client and where the remote query processor is dedicated for processing one or more queries from the client, and making the second code available to the remote query processor. The method can also include loading the second code at the remote query processor, and continuing executing the one or more query tasks at the remote query processor using a combination of two or more of the initial code deployment, the first code and the second code.

The first code can include code executable by a virtual machine and the second code includes code executable by the virtual machine. The second code can include a data system query language portion, and the executing can include parsing the query language portion into computer code, compiling the computer code into executable code configured to be executable on a virtual machine, and executing the executable code on the virtual machine.

The first dynamic code can include a data system query language portion, and the executing can include parsing the query language portion into computer code, compiling the computer code into executable code configured to be executable on a virtual machine, and executing the executable code on the virtual machine.

DETAILED DESCRIPTION

Reference may be made herein to the Java programming language, Java classes, Java bytecode and the Java Virtual Machine (JVM) for purposes of illustrating example implementations. It will be appreciated that implementations can include other programming languages (e.g., groovy, Scala, R, Go, etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
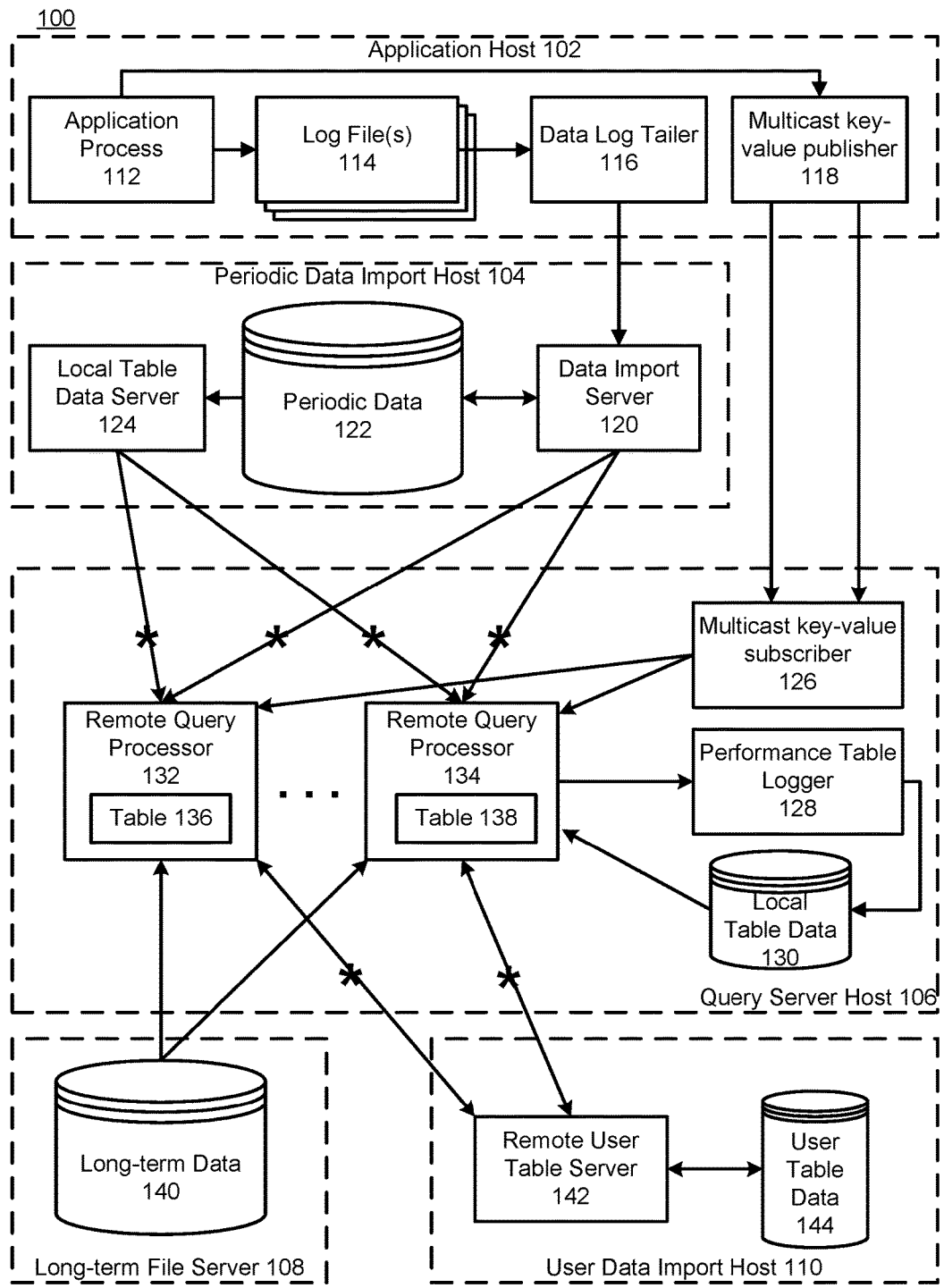
FIG. 1 is a diagram of an example computer data system showing an example data distribution configuration in accordance with some implementations.
Figure 2:
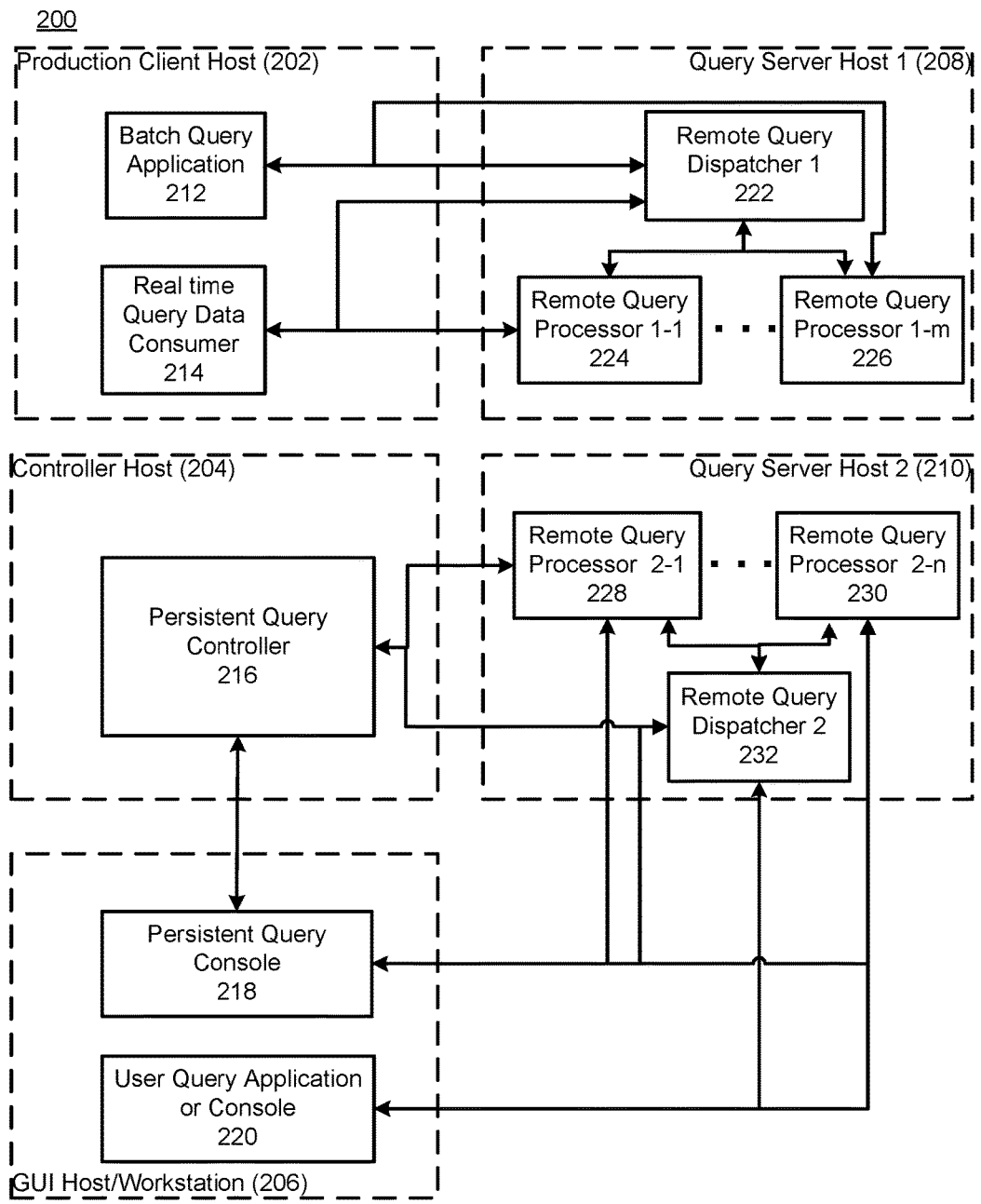
FIG. 2 is a diagram of an example computer data system showing an example administration/process control arrangement in accordance with some implementations.

FIG. 1 is a diagram of an example computer data system and network 100 showing an example data distribution configuration in accordance with some implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( ) statement execution, for example. A TableMap object can be the result of a byExternal( ) statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

The local table data server 124 can be configured to retrieve data stored in the periodic table data store 122 and provide the retrieved data to one or more remote query processors (132, 134) via an optional proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS, for example.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors. Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to the persistent query controller 216, and the persistent query controller 216 starts and runs the query every day. In another example, a securities trading strategy could be a persistent query. The persistent query controller can start the trading strategy query every morning before the market opened, for instance. It will be appreciated that 216 can work on times other than days. In some implementations, the controller may require its own clients to request that queries be started, stopped, etc. This can be done manually, or by scheduled (e.g., cron jobs). Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

Figure 3:
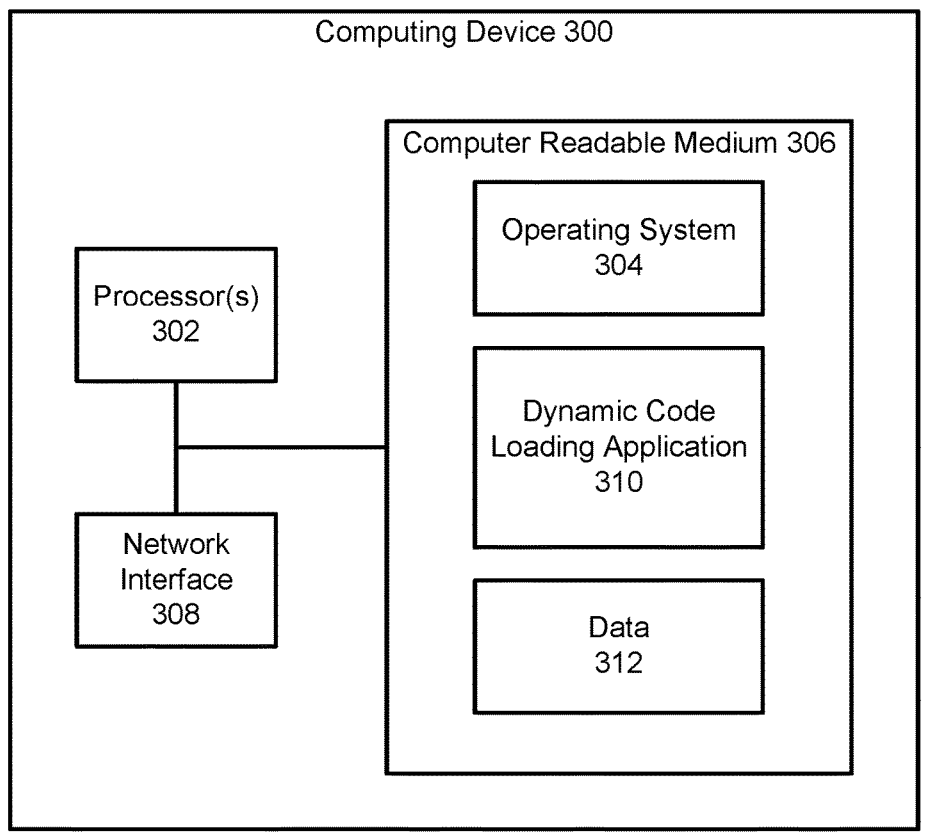
FIG. 3 is a diagram of an example computing device configured for GUI control element processing in accordance with some implementations.

FIG. 3 is a diagram of an example computing device 300 in accordance with at least one implementation. The computing device 300 includes one or more processors 302, operating system 304, computer readable medium 306 and network interface 308. The memory 306 can include a query dispatch/execution application 310 and a data section 312 (e.g., for storing query, query processor and/or client data, etc.).

In operation, the processor 302 may execute the application 310 stored in the memory 306. The application 310 can include software instructions that, when executed by the processor, cause the processor to perform operations for query dispatch and execution in accordance with the present disclosure (e.g., performing one or more of 502-524 described below). The application program 310 can operate in conjunction with the data section 312 and the operating system 304.

Figure 4:
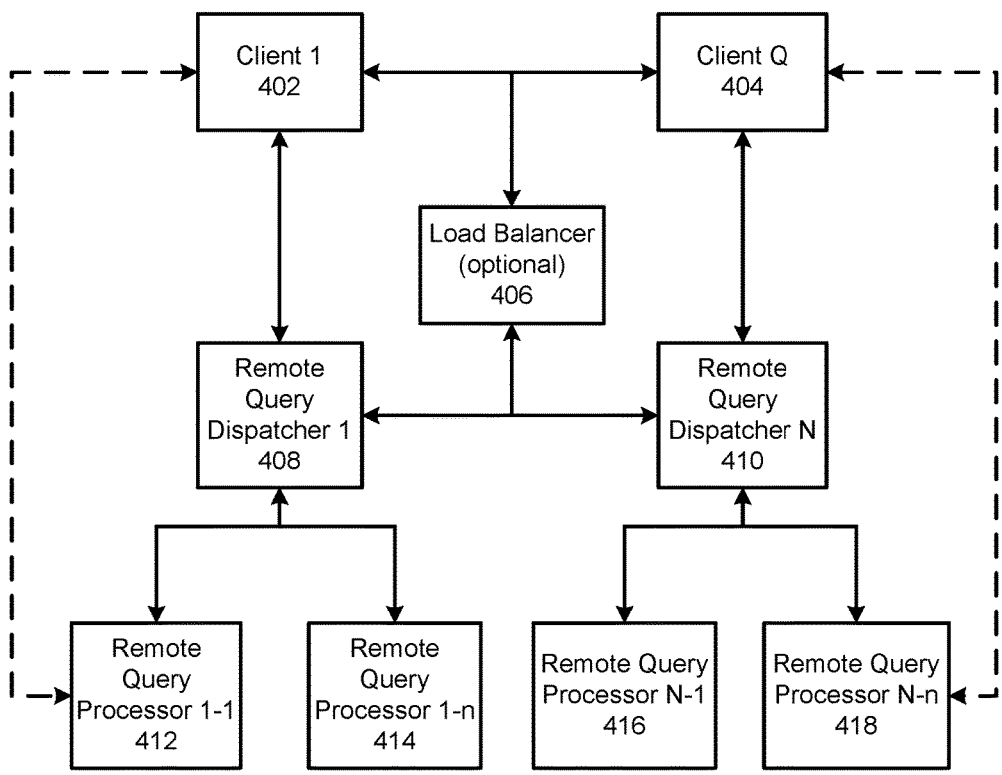
FIG. 4 is a diagram of an example query dispatch/execution architecture in accordance with some implementations.

FIG. 4 is a diagram of an example remote query dispatch and execution architecture 400 in accordance with some implementations. The remote query dispatch and execution architecture 400 includes a first client 402, a second client 404, an optional load balancer 406 (e.g., one or more load balancers and/or a distributed load balancer), a first remote query dispatcher 408, a second remote query dispatcher 410, and a plurality of remote query processors 412-418 connected to a respective remote query dispatcher and client. The remote query dispatcher (e.g., 408, 410) and the corresponding remote query processors (e.g., 412-418) can reside on a single computer system or on different computer systems. The process of a client requesting a remote query processor from a remote query dispatcher and a remote query dispatcher fulfilling the client request is described below in connection with FIG. 5.

The load balancer 406 could be implemented as a sub-module within each remote query dispatcher 408, 410. This configuration could support a distributed system with each remote query dispatcher participating in a distributed state exchange and a single "leader" remote query dispatcher making scheduling decisions for all participating remote query dispatchers. The load balancer 406 could also include a distributed 100% uptime load balancer. It will be appreciated that if a load balancer 406 is included in an implementation, the clients (402, 404) may connect to the remote query dispatchers (408, 410) through the load balancer 406. When a load balancer is not included or is integrated within each remote query dispatcher, the clients (402, 404) may connect directly to respective remote query dispatchers (408, 410).

In some implementations, multiple clients can connect to a single remote query processor. Also, in some implementations a client can connect to multiple remote query processors via multiple intermediate clients. For example, a persistent query controller process (e.g., 216) may connect to potentially dozens of different remote query processors (e.g., 228, 230). Each of these connections can be independent of the others, but it may be possible for the client (i.e., the persistent query controller process 216 in the controller host 204) to combine the results from multiple remote query processors using table APIs such that the work to combine these results occurs on the client side (e.g., in the controller host 204).

In another example, a widget can be configured to connect to eight different remote query processors. The widget can combine the data from three queries together (e.g., one query contains position data, one query contains inputs from traders, and the other query contains data relevant to all traders for a given symbol) to make a table that is presented to the user. This is also an example of client side processing. The client combines the position data, input data, and then the symbol data into one view by dividing the symbol data into put and call options (two filters), then joining them together, and joining the user's positions and their inputs to the generic symbol data. As users are typically looking at a small subset of the system at once (one symbol each out of a few thousand), the burden on the server can be greatly reduced.

In some implementations, a client process can be a client to multiple remote query dispatchers (via separate remote query dispatcher-connections) and multiple remote query processors on multiple host machines (via separate processor-connections). A remote query processor can also serve as a client—it can request that a remote query dispatcher create additional remote query processors and/or serve as a client to another remote query processor.

In some implementations, processing can be shared between a remote query processor and a client (e.g., between 402 and 412). For example, given a script running a very complex query and a GUI configured to display a subset of tables from the query. All of the tables may be hosted and updated by the server. The end user may be looking at one of the tables and determine that they want to filter the table so that they can see a subset of the rows (e.g., for the symbol AAPL). This filtering may take place on the client side. Assuming the table is not too large, filtering on the client side can be more responsive and faster, while reducing load on the server.

Remote query processors can be configured to stream data to another location (e.g., a trading system, one or more other remote query processors). For example, a GUI can be attached to a running query script such that the remote query processor streams data from the query to the GUI. In another example, a query script implements a trading strategy. During the execution of the query script, a call is made to register the remote query processor with the trading system. During the registration process a connection is made to the trading execution system, and information about the remote query processor is sent to the trading execution system (address, port, etc.).

Later in the script, calls are made to register an order table with the trading system. This registration sets up a communication channel to stream changes in the order table (add/modify/delete in the current case) to the trading system.

In yet another example, a query may need data derived from a source the user does not have permission to see. For example, a need may exist to know a firm's net stock position (e.g., this may be required for correct short/long marking of a sale), but not have visibility into the individual positions of other traders. A query can run as a privileged user, and be configured to aggregate all the positions. The system allows other remote query processors to connect and get the aggregate positions table (e.g., to determine how to properly mark trades), but the system will not permit users to see the underlying data that went into the query.

It will be appreciated that the query dispatch/execution architecture 400 is a simplified configuration for purposes of illustrating the principles of the disclosed subject matter. An actual implementation may include one or more clients, zero or more load balancers, one or more remote query dispatchers and zero or more remote query processors associated with each remote query dispatcher.

Figure 5:
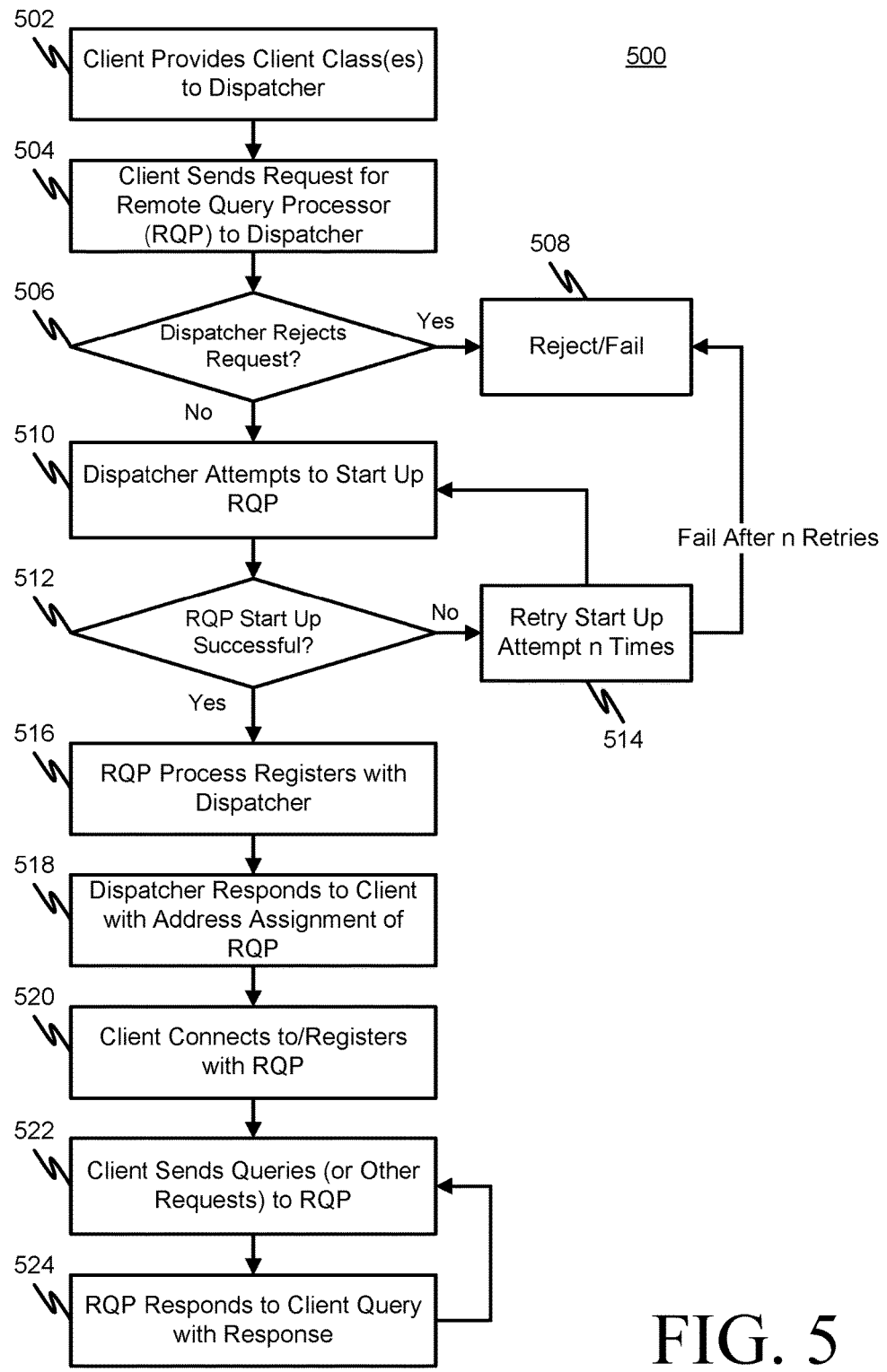
FIG. 5 is a flowchart showing an example method of operation for a query dispatch/execution architecture in accordance with some implementations.

FIG. 5 is a flowchart showing an example method 500 of operation for a query dispatch and execution architecture (e.g., as shown in FIG. 2 or FIG. 4) in accordance with some implementations. Processing begins at 502, where a client optionally provides (or "pushes") code such as one or more client classes to a remote query dispatcher and sends a request for a remote query processor to the remote query dispatcher 504. The client code (e.g., one or more classes, or the like) and the request can be sent to the remote query dispatcher via an optional load balancer (as described above). The code provided by the client can include executable code components, programming language code, scripts, strings, libraries, and/or the like. Processing continues to 506.

At 506, it is determined whether the remote query dispatcher rejects the request for a remote query processor from the client. For example, the remote query dispatcher may reject a request for a number of reasons including, but not limited to, one or more of the following: a lack of storage space on a server (e.g., not enough RAM on the server), a server about to reboot, a server no longer accepting query jobs, client does not have permission to run query on the server, client has exhausted the query quota allocated to the client. Also, the request may be rejected when a client has specified invalid settings, either immediately determined by the remote query dispatcher, or presumed after a configured number of attempts to start processors for the query fail. Further, the request may be rejected when an administrative user has requested that the query job be cancelled or rejected. If the remote query dispatcher rejects the request for a remote query processor, processing continues to 508 where the remote query dispatcher rejects the request and informs the client. Otherwise, processing continues to 510.

At 510, the remote query dispatcher attempts to start up a remote query processor. Starting up a remote query processor can include the remote query dispatcher allocating resources and instantiating the remote query processor runtime engine (e.g., Java virtual machine or JVM), configuring garbage collection, etc. In starting up a remote query processor, the remote query dispatcher may specify override classes or alternative classpaths to use when starting the remote query processor. This allows the remote query processors to be running different code versions or allows users to run slight tweaks in their own versions. Query related parameters are also passed to the remote query processors. These include JVM arguments, amount of RAM to use, etc. Start up of a remote query processor can also be based on information received from the client in the request for a remote query processor. The client request can include one or more of:

(1) a description for display on various monitoring dashboards;
(2) client authentication token;
(3) desired processor heap size;
(4) desired processor time to live;
(5) virtual machine (e.g., JVM) parameters that should be passed to the processor—used for configuring the JVM itself (e.g. garbage collection settings, other performance settings, etc), or specifying "system properties" for the application code to reference;
(6) environment variables (e.g., in the UNIX sense) that should be set for the processor;
(7) libraries or directories that should be included in the processor's classpath, usually including but not limited to (a) the directory that the client's pushed classes are saved to by the dispatcher, (b) a directory of "cached" classes generated by compiling query language artifacts, and (c) user-specific libraries or directories enabled according to the authentication token; and
(8) hints about how the processor should be treated for resource allocation purposes (interactivity flags, priority flags used for balancing demands from the same client or user). Processing continues to 512.

At 512, it is determined whether the remote query processor was successfully started up. If so, processing continues to 516. Otherwise, processing continues to 514.

At 514, the system makes a given number of retries to start up the remote query processor. If the remote query processor is not successfully started within the given number of retries, processing continues to 508, where the remote query processor startup fails and the remote query dispatcher returns a fail indication to the client. In some implementations, the dispatcher may try multiple times to start a remote query processor with the client's requested parameters, and a contemplated load balancer/distributed-dispatcher may similarly try to start a remote query processor multiple times on the same or different hosts. There may be some requests that will result in a rejection due to lack of entitlement, invalid settings, or repeated processor startup errors, Rejections can be communicated via messages to the client over the network connection between the client and the remote query dispatcher. For example, the rejection can be presented to the client code as a Java Exception (or potentially similar language-appropriate mechanisms in the future) with details that explain the reason for the rejection.

Client requests also may specify a timeout—if the request is not satisfied after a specified delay, the client process will asynchronously issue a cancellation for the request already in progress, triggering a rejection from the dispatcher.

At 516, the remote query processor registers with the remote query dispatcher. Remote query processors register with a remote query dispatcher at start-up. Registration can include the remote query processor establishing a communication channel to the remote query dispatcher (e.g., via a TCP/IP socket, connected via a well-known port that the dispatcher listens on), sending a registration message that signals to the remote query dispatcher that the remote query processor is available for client connections, and keeping this channel open for (1) heartbeat messages in both directions, (2) control messages from the remote query dispatcher to the remote query processor, and (3) performance data messages from the remote query processor to the remote query dispatcher.

If the remote query processor fails in start up, the remote query dispatcher will not receive this registration message, and under most circumstances it will eventually observe the remote query processor's death (by monitoring the child process' output streams for end-of-file, and waiting for the child process' exit status, in the Java/UNIX sense). Processing continues to 518.

At 518, the remote query dispatcher responds to the client with a host and a port assignment of the remote query processor. In general, the remote query dispatcher can provide the client with addressing information to permit the client to begin sending messages to and receiving messages from the remote query processor. In some implementations, the remote query dispatcher supplies a host (or the client already knows the host) and a port that can be used to connect a TCP/IP socket. Processing continues to 520.

At 520, the client connects to/registers with the remote query processor. While the client is now in direct communications with the remote query processor, the remote query processor may maintain a connection to the remote query dispatcher. The remote query processor-dispatcher connection may provide the remote query dispatcher with an indication of remote query processor "liveness" registering/monitoring as well as client-request-performance logging data. The monitoring of remote query processor liveness can provide an advantage of reducing or eliminating rogue remote query processor. Processing continues to 522.

At 522, the client sends one or more queries (or other requests) to the remote query processor. Processing continues to 524.

At 524, the remote query processor responds to the client query (or other request).

During continued processing, there may be repeated cycles of 522/524 as the client makes requests and the remote query processor responds.

Remote query processors may reach a termination condition. A remote query processor can terminate under certain circumstances, including, but not limited to: an unrecoverable error (e.g., JVM heap exhaustion); "primary" client disconnection from the remote query processor for any reason (where the primary client is the initial client that requested and first connected to the remote query processor); a remote query dispatcher requests that a remote query processor terminate (e.g., due to administrator command, or in response to primary client disconnection from the remote query dispatcher, etc.); and a remote query dispatcher disconnects from the remote query processor for any reason (e.g., as a fail-safe to keep unmanaged processes from continuing).

Figure 6:
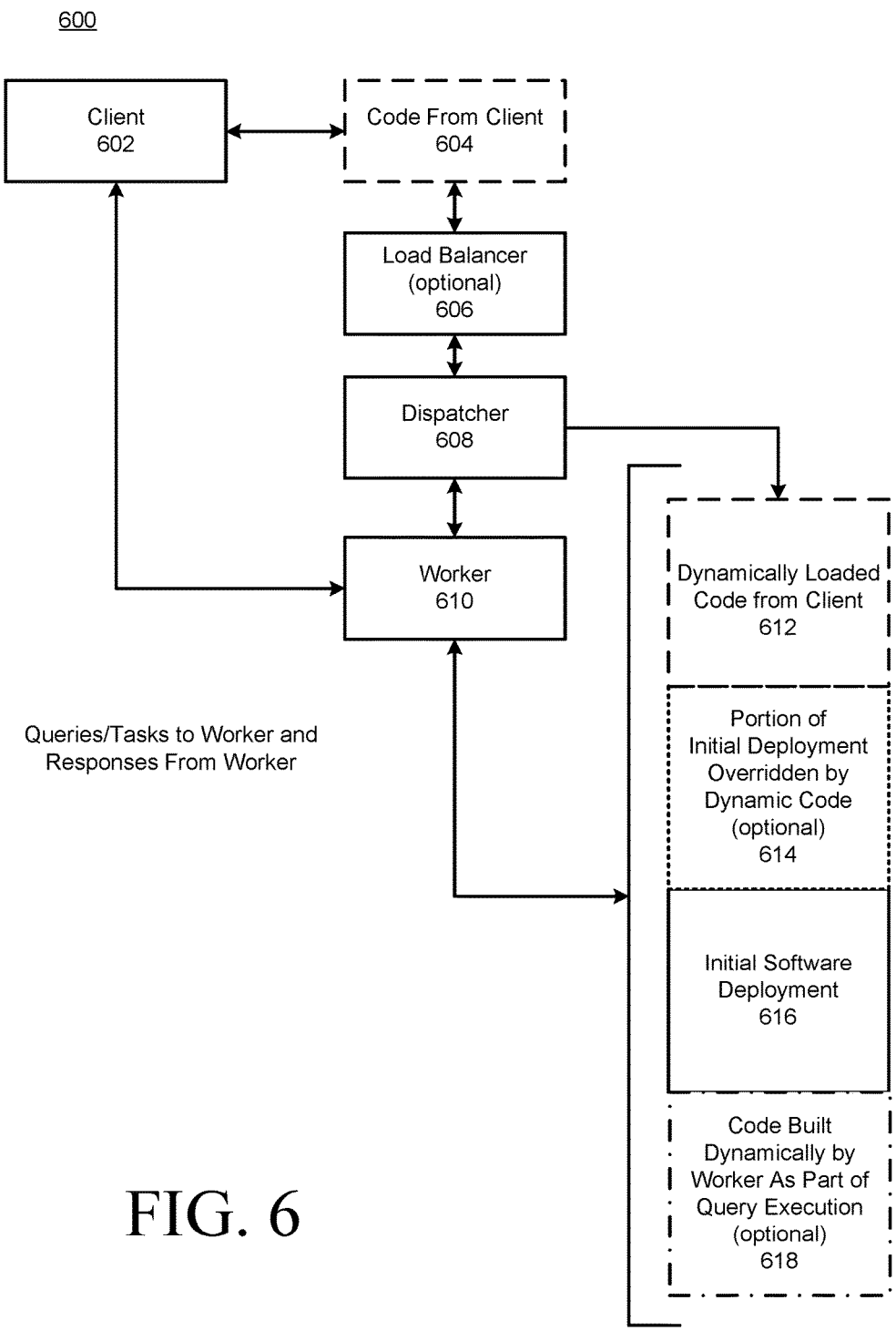
FIG. 6 is a diagram of an example dynamic code loading configuration within an example query dispatch and execution architecture in accordance with some implementations.

FIG. 6 is a diagram of an example dynamic code loading configuration 600 including a client 602, code being pushed from the client 604, an optional load balancer 606, a dispatcher 608, a remote query processor 610, dynamically loaded code from the client 612, an optional portion of an initial (or regular) deployment overridden by dynamically loaded code from the client 614, an initial software deployment 616, and code built dynamically by the remote query processor as part of query execution 618. It will be appreciated that the example configuration shown in FIG. 6 is simplified for purposes of illustrating principles of the disclosed subject matter. An actual implementation of the subject matter disclosed herein could include multiple clients on one or more client hosts, multiple load balancers, multiple dispatchers and multiple remote query processors.

In general, the client 602 requests a remote query processor from the dispatcher 608 to perform a job (e.g., one or more sequences of query task executions). In order to perform the job, the remote query processor needs code to execute. The code a remote query processor executes to perform the job can be provided to the remote query processor using one or more of the methods described below.

In a first method, a remote query processor 610 may use code deployed as part of the initial software deployment 616. This can establish a baseline environment for all queries on a given server host. In a Java language example, the initial deployment can include a deployment of .jar files (e.g., via RPM installation, etc.), or .class files deployed as part of a one-off deployment. The .class files may be thought of as "overriding" a portion of an initial software code deployment.

In some implementations, the first method can include the client supplying additional paths to include as part of a remote query processor's classpath (e.g., for previously deployed "extra" libraries). Also, scripts used by the dispatcher to start the remote query processor can dynamically select classpath elements to include (e.g., because the authenticated user that requested the remote query processor is entitled to use additional libraries, scripts, code repositories, etc.).

In a second method, the client 602 may push one or more code classes 604 to the dispatcher 608 to be persisted on the server host (e.g., 208-210) in URLs that will be part of the remote query processor JVM's classpath. While code classes are used herein as an example, it will be appreciated that other code portions could be provided such as individual modules, files, libraries, etc. The dynamically loaded code 612 may "override" a portion 614 or all of the initial code deployment 616. This method can permit classes that are available at remote query processor-request-time (e.g., prior to remote query processor start up) to be available to the remote query processor, and may provide an advantage of being a mechanism that can reliably and safely replace (or augment) core data system engine/server component classes as well as a mechanism for deploying new functionality to all or a subset of users.

In a third method, the client 602 can push classes to the dispatcher 608 to be persisted on the server host (e.g., 208-210) in URLs that will be searched by ClassLoaders on the remote query processor 610 at runtime. This method can permit classes that are created after the remote query processor is created (and after the remote query processor starts up) to be available to the remote query processor. The third method may provide greater flexibility than the second method, but may be less powerful in the sense that the third method may encounter runtime conflicts if used for core classes. In some implementations, the third method can be implemented without involvement by the dispatcher (e.g., provided directly from a client, provided from a load balancer, etc.).

In a fourth method, the remote query processor 610 can compile additional code in the remote query processor 610 to .class files 618 to be persisted by the remote query processor 610 and loaded using the second method or third method described above. This method can be used for truly dynamic classes created as part of query execution.

In some implementations, a typical query task is submitted as (a) an instance of a class implementing a remote query interface, (b) a remote method invocation on a Table handle object, or (c) a script (or line of scripting code) to be evaluated by an interpreter on the remote query processor. In the case of (a), the class that the query is an instance of, and any classes it directly depends on, are made available to the remote query processor using one of the first three methods described above. The method most appropriate for a given situation depends on the use case. The first method can be used for non-experimental "production" work-flows because it may be somewhat easier to debug and administer than the other methods. In some implementations, a remote query processor may typically use the first and fourth methods described above along with one of the second or third methods.

The second method described above was developed to provide, among other things, wider latitude in the classes that might be replaced by making them available to a system ClassLoader in the remote query processor at start up time. This can help avoid the risk of loading the wrong version of a class, or creating runtime conflicts between objects instantiated using different ClassLoaders. One difficulty for method three described above is that it may often need to violate the standard ClassLoader delegation model, by design.

Figure 7:
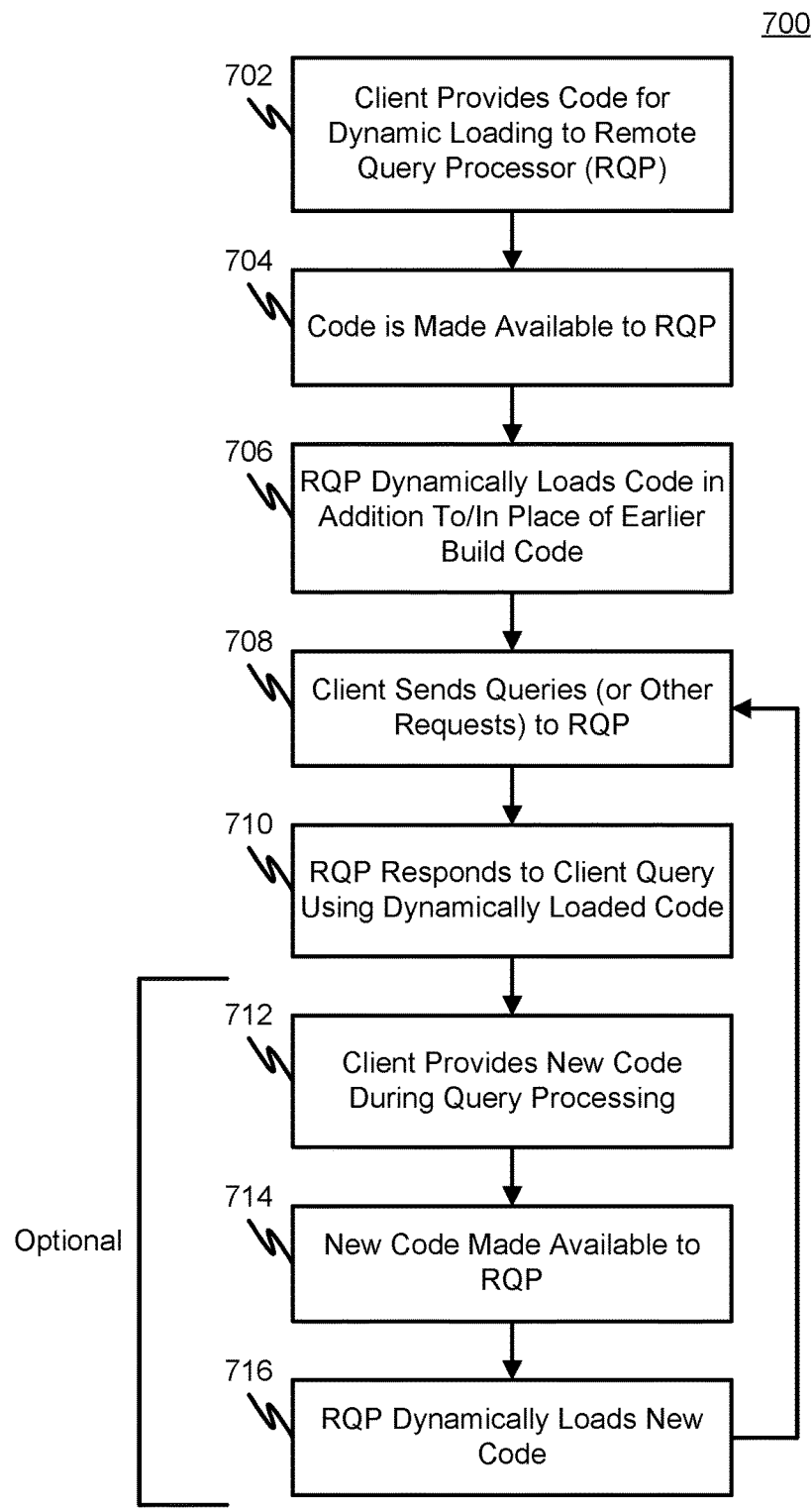
FIG. 7 is a flowchart of an example dynamic code loading process in accordance with some implementations.

FIG. 7 is a flowchart of an example dynamic code loading process 700 in accordance with some implementations. Processing begins at 702 where a client provides code to a dispatcher for dynamic loading to a remote query processor. For example, a client 602 can push one or more Java class files to the dispatcher (or directly to a remote query processor). Processing continues to 704.

At 704, the dispatcher makes the code provided by the client available to a remote query processor. In some implementations, the dispatcher can make the code available by writing .class files to a directory that the remote query processor is aware of, which is then used on-demand as a result of interpreting client query task instances. For example, the dispatcher can place the code from the client into a URL in the classpath of the JVM, or place the code into a URL searched by a ClassLoader of the remote query processor. Processing continues to 706.

At 706, the remote query processor dynamically loads the code provided by the dispatcher. The dynamically loaded code can be in addition to a regular software distribution or may override a portion of the regular software distribution. Processing continues to 708.

At 708, the client sends a job (e.g., a series of one or more query tasks) to the remote query processor. Processing continues to 710.

At 710, the remote query processor processes the job request from the client and responds with a result determined in part using the dynamically loaded code from the client. Processing continues to 712-716, which are optional.

712-716 provide a method for the remote query processor to dynamically load code during query job processing (i.e., "mid-query"). This may be done by end users to incorporate new functionality not available in a regular software deployment of the data system.

At 712, the client provides new code during the processing of a job by the remote query processor. Processing continues to 714.

At 714, the new code is made available to the remote query processor using one or more of the techniques described above. For example, the new (or override) code can be provided from the client, an alternative classpath, etc. The mechanism used to get the code to the remote query processor can include one or more of providing the code directly from the client, providing the code from the dispatcher, and/or providing the code via an alternative classpath. Further, the code may be dynamically generated from a data system query language string or portion provided from the client. For example, for a given query such as t2=t2.update("A=sqrt(2*B)+C"), the string "A=sqrt(2*B)+C" can be parsed, converted to programming language code (e.g., Java), compiled, and used in the resulting query. Processing continues to 716.

At 716, the remote query processor dynamically loads the new code and continues processing the job to produce a result that is based at least in part on the newly loaded code.

In some implementations, the code can be provided as compiled class files. The class files can be anything suitable to execute on a virtual machine (e.g., JVM). The code can range from a single class up to the code for an entire computer data system. The class files can include a) Java code that has been compiled to JVM bytecode files; b) non-Java code (e.g. scala, groovy, etc.) that has been compiled to JVM bytecode files; and/or c) JVM classes and objects that have been dynamically generated. For example, functions, closures, and classes written in a Groovy command line session can be automatically pushed to back end remote query processors for use in queries.

In general, any technique suitable for creating JVM bytecode could be used. In some implementations, class files created from a variety of languages using either static or dynamic compilation are sent to the remote query processors from clients via a dispatcher or directly from the client to the remote query processor. Also, dynamically interpreted scripts could be provided.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA), graphics processing unit (GPU) or the like. The instructions can be compiled from source code instructions provided in accordance with a programming language such as Java, C, C++, C#.net, assembly or the like. The instructions can also comprise code and data objects provided in accordance with, for example, the Visual Basic™ language, a specialized database query language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like. The processor and/or computer readable medium can include photonics, spintronics, and/or quantum devices.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

While code classes are used herein as an example, it will be appreciated that other code portions could be provided such as individual modules, files, libraries, etc.

It is, therefore, apparent that there is provided, in accordance with the various embodiments disclosed herein, methods, systems and computer readable media for dynamic code loading.

Application Ser. No. 15/154,974, entitled "DATA PARTITIONING AND ORDERING" and filed in the United States Patent and Trademark Office on May 14, 2016, is hereby incorporated by reference herein in its entirety as if fully set forth herein.

Application Ser. No. 15/154,975, entitled "COMPUTER DATA SYSTEM DATA SOURCE REFRESHING USING AN UPDATE PROPAGATION GRAPH" and filed in the United States Patent and Trademark Office on May 14, 2016, is hereby incorporated by reference herein in its entirety as if fully set forth herein.

Application Ser. No. 15/154,979, entitled "COMPUTER DATA SYSTEM POSITION-INDEX MAPPING" and filed in the United States Patent and Trademark Office on May 14, 2016, is hereby incorporated by reference herein in its entirety as if fully set forth herein.

Application Ser. No. 15/154,980, entitled "SYSTEM PERFORMANCE LOGGING OF COMPLEX REMOTE QUERY PROCESSOR QUERY OPERATIONS" and filed in the United States Patent and Trademark Office on May 14, 2016, is hereby incorporated by reference herein in its entirety as if fully set forth herein.

Application Ser. No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" and filed in the United States Patent and Trademark Office on May 14, 2016, is hereby incorporated by reference herein in its entirety as if fully set forth herein.

Application Ser. No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" and filed in the United States Patent and Trademark Office on May 14, 2016, is hereby incorporated by reference herein in its entirety as if fully set forth herein.

Application Ser. No. 15/154,985, entitled "PARSING AND COMPILING DATA SYSTEM QUERIES" and filed in the United States Patent and Trademark Office on May 14, 2016, is hereby incorporated by reference herein in its entirety as if fully set forth herein.

Application Ser. No. 15/154,987, entitled "DYNAMIC FILTER PROCESSING" and filed in the United States Patent and Trademark Office on May 14, 2016, is hereby incorporated by reference herein in its entirety as if fully set forth herein.

Application Ser. No. 15/154,988, entitled "DYNAMIC JOIN PROCESSING USING REAL-TIME MERGED NOTIFICATION LISTENER" and filed in the United States Patent and Trademark Office on May 14, 2016, is hereby incorporated by reference herein in its entirety as if fully set forth herein.

Application Ser. No. 15/154,990, entitled "DYNAMIC TABLE INDEX MAPPING" and filed in the United States Patent and Trademark Office on May 14, 2016, is hereby incorporated by reference herein in its entirety as if fully set forth herein.

Application Ser. No. 15/154,991, entitled "QUERY TASK PROCESSING BASED ON MEMORY ALLOCATION AND PERFORMANCE CRITERIA" and filed in the United States Patent and Trademark Office on May 14, 2016, is hereby incorporated by reference herein in its entirety as if fully set forth herein.

Application Ser. No. 15/154,993, entitled "A MEMORY-EFFICIENT COMPUTER SYSTEM FOR DYNAMIC UPDATING OF JOIN PROCESSING" and filed in the United States Patent and Trademark Office on May 14, 2016, is hereby incorporated by reference herein in its entirety as if fully set forth herein.

Application Ser. No. 15/154,995, entitled "QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/154,996, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/154,997, entitled "DYNAMIC UPDATING OF QUERY RESULT DISPLAYS" and filed in the United States Patent and Trademark Office on May 14, 2016, is hereby incorporated by reference herein in its entirety as if fully set forth herein.

Application Ser. No. 15/154,998, entitled "DYNAMIC CODE LOADING" and filed in the United States Patent and Trademark Office on May 14, 2016, is hereby incorporated by reference herein in its entirety as if fully set forth herein.

Application Ser. No. 15/154,999, entitled "IMPORTATION, PRESENTATION, AND PERSISTENT STORAGE OF DATA" and filed in the United States Patent and Trademark Office on May 14, 2016, is hereby incorporated by reference herein in its entirety as if fully set forth herein.

Application Ser. No. 15/155,001, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/155,005, entitled "PERSISTENT QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/155,006, entitled "SINGLE INPUT GRAPHICAL USER INTERFACE CONTROL ELEMENT AND METHOD" and filed in the United States Patent and Trademark Office on May 14, 2016, is hereby incorporated by reference herein in its entirety as if fully set forth herein.

Application Ser. No. 15/155,007, entitled "GRAPHICAL USER INTERFACE DISPLAY EFFECTS FOR A COMPUTER DISPLAY SCREEN" and filed in the United States Patent and Trademark Office on May 14, 2016, is hereby incorporated by reference herein in its entirety as if fully set forth herein.

Application Ser. No. 15/155,009, entitled "COMPUTER ASSISTED COMPLETION OF HYPERLINK COMMAND SEGMENTS" and filed in the United States Patent and Trademark Office on May 14, 2016, is hereby incorporated by reference herein in its entirety as if fully set forth herein.

Application Ser. No. 15/155,010, entitled "HISTORICAL DATA REPLAY UTILIZING A COMPUTER SYSTEM" and filed in the United States Patent and Trademark Office on May 14, 2016, is hereby incorporated by reference herein in its entirety as if fully set forth herein.

Application Ser. No. 15/155,011, entitled "DATA STORE ACCESS PERMISSION SYSTEM WITH INTERLEAVED APPLICATION OF DEFERRED ACCESS CONTROL FILTERS" and filed in the United States Patent and Trademark Office on May 14, 2016, is hereby incorporated by reference herein in its entirety as if fully set forth herein.

Application Ser. No. 15/155,012, entitled "REMOTE DATA OBJECT PUBLISHING/SUBSCRIBING SYSTEM HAVING A MULTICAST KEY-VALUE PROTOCOL" and filed in the United States Patent and Trademark Office on May 14, 2016, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A computer data system providing dynamic code loading within a query dispatch and execution architecture, the system comprising:
   one or more processors;
   computer readable storage coupled to the one or more processors, the computer readable storage having stored thereon instructions that, when executed by the one or more processors, cause the one or more processors to perform operations including:
   providing, from a client computer system, first dynamic code for execution by a remote query processor within a remote query server computer system, where the remote query processor includes an executable code environment established according to request parameters provided by a primary client on the client computer system and where the remote query processor is dedicated for processing one or more queries from the primary client;
   making the first dynamic code available to the remote query processor;
   loading the first dynamic code at the remote query processor;
   accessing, at the remote query processor, one or more data system query tasks sent from the primary client; and
   executing, at the remote query processor, the one or more data system query tasks using an initial code deployment and the first dynamic code,
   wherein the first dynamic code overrides at least a portion of the initial code deployment, and
   wherein the first dynamic code adds one or more functions to the initial code deployment.

2. The computer data system of claim 1, wherein the operations further include:
   providing, from the client, second dynamic code while the executing is being performed by the remote query processor;
   making the second dynamic code available to the remote query processor;
   loading the second dynamic code at the remote query processor; and
   continuing executing the one or more query tasks at the remote query processor using the initial code deployment, the first dynamic code and the second dynamic code.

3. The computer data system of claim 2, wherein the first dynamic code includes code executable by one or more virtual machines and the second dynamic code includes code executable by the one or more virtual machines.

4. The computer data system of claim 2, wherein the second dynamic code overrides at least a portion of the initial code deployment.

5. The computer data system of claim 2, wherein the second dynamic code adds one or more functions to the initial code deployment.

6. The computer data system of claim 1, wherein making the first dynamic code available to the remote query processor includes persisting the first dynamic code on a server host at a URL forming part of a classpath of a virtual machine of the remote query processor.

7. The computer data system of claim 1, wherein making the first dynamic code available to the remote query processor includes persisting on a server host at a URL that will be searched by a class loader of the remote query processor at runtime.

8. The computer data system of claim 1, wherein the first dynamic code includes a data system query language portion, and
   wherein the executing includes:
   parsing the query language portion into computer code;
   compiling the computer code into executable code configured to be executable on a virtual machine; and
   executing the executable code on the virtual machine.

9. A method comprising:
   executing, at a remote query processor, one or more query tasks using an initial code deployment;
   providing, from a client, first dynamic code during execution of the initial code deployment by the remote query processor, where the remote query processor includes an executable code environment established according to request parameters provided by the client and where the remote query processor is dedicated for processing one or more queries from the client;
   making the first dynamic code available to the remote query processor;
   loading the first dynamic code at the remote query processor;
   and
   continuing executing, at the remote query processor, the one or more query tasks using the initial code deployment and the first dynamic code,
   wherein the first dynamic code overrides at least a portion of the initial code deployment and wherein the first dynamic code adds one or more functions to the initial code deployment.

10. The method of claim 9, further comprising:
    providing, from the client, second code while the executing is being performed by the remote query processor;
    making the second code available to the remote query processor;
    loading the second code at the remote query processor; and
    continuing executing the one or more query tasks at the remote query processor using the initial code deployment, the first dynamic code and the second code.

11. The method of claim 9, wherein the first dynamic code includes code executable by a virtual machine and the second code includes code executable by the virtual machine.

12. The method of claim 10, wherein the second code overrides at least a portion of the initial code deployment.

13. The method of claim 10, wherein the second code adds one or more functions to the initial code deployment.

14. The method of claim 9, wherein making the first dynamic code available to the remote query processor includes persisting the first dynamic code on a server host at a URL forming part of a classpath of a virtual machine of the remote query processor.

15. The method of claim 9, wherein making the first dynamic code available to the remote query processor includes persisting the first dynamic code on a server host at a URL that will be searched by a class loader of the remote query processor at runtime.

16. The method of claim 10, wherein the second code includes a data system query language portion, and wherein the executing includes:
parsing the query language portion into computer code;
compiling the computer code into executable code configured to be executable on a virtual machine; and
executing the executable code on the virtual machine.

17. A method comprising:
executing, at a remote query processor, one or more data system query tasks using first code;
providing, from a client, second dynamic code before or during execution of the first code being performed by the remote query processor, where the remote query processor includes an executable code environment established according to request parameters provided by the client and where the remote query processor is dedicated for processing one or more queries from the client;
making the second dynamic code available to the remote query processor;
loading the second dynamic code at the remote query processor; and
continuing executing the one or more data system query tasks at the remote query processor using a combination of the first code and the second dynamic code,
wherein the second dynamic code overrides at least a portion of the first code.

18. The method of claim 17, wherein the first code includes code executable by a virtual machine and the second dynamic code includes code executable by the virtual machine.

19. The method of claim 17, wherein the second dynamic code includes a data system query language portion, and wherein the executing includes:
parsing the query language portion into computer code;
compiling the computer code into executable code configured to be executable on a virtual machine; and
executing the executable code on the virtual machine.

20. The computer data system of claim 2, wherein the first dynamic code includes a data system query language portion, and
wherein the executing includes:
parsing the query language portion into computer code;
compiling the computer code into executable code configured to be executable on a virtual machine; and
executing the executable code on the virtual machine.

21. The method of claim 17, wherein the second dynamic code adds one or more functions to the first code.

22. The computer data system of claim 1, wherein the one or more functions added to the initial code deployment by the first dynamic code overrides one or more functions of the initial code deployment.

23. The method of claim 9, wherein the one or more functions added to the initial code deployment by the first dynamic code overrides one or more functions of the initial code deployment.

24. The method of claim 21, wherein the one or more functions added to the first code by the second dynamic code overrides one or more functions of the first code.

* * * * *